(12) United States Patent
Kopack

(10) Patent No.: US 12,363,097 B2
(45) Date of Patent: Jul. 15, 2025

(54) SYSTEMS AND METHODS FOR CRYPTOGRAPHIC AUTHENTICATION

(71) Applicant: TRUSONA, INC., Scottsdale, AZ (US)

(72) Inventor: David Michael Kopack, Scottsdale, AZ (US)

(73) Assignee: Trusona, Inc., Scottsdale, AZ (US)

( * ) Notice: Subject to any disclaimer, the term of this patent is extended or adjusted under 35 U.S.C. 154(b) by 183 days.

(21) Appl. No.: 17/937,821

(22) Filed: Oct. 4, 2022

(65) Prior Publication Data

US 2023/0179589 A1  Jun. 8, 2023

Related U.S. Application Data

(63) Continuation of application No. PCT/US2021/027732, filed on Apr. 16, 2021.

(60) Provisional application No. 63/011,775, filed on Apr. 17, 2020.

(51) Int. Cl.
*H04L 9/40* (2022.01)

(52) U.S. Cl.
CPC ........ *H04L 63/083* (2013.01); *H04L 63/0492* (2013.01); *H04L 63/0876* (2013.01)

(58) Field of Classification Search
CPC ............... H04L 63/083; H04L 63/0492; H04L 63/0876; H04L 63/18; H04L 63/08; H04L 67/02; H04W 12/63
See application file for complete search history.

(56) References Cited

U.S. PATENT DOCUMENTS

| 7,213,766 | B2 | 5/2007 | Ryan et al. |
| 8,763,097 | B2* | 6/2014 | Bhatnagar ............ H04L 63/083 713/168 |
| 9,589,399 | B2 | 3/2017 | Taveau et al. |
| 9,876,794 | B2* | 1/2018 | Adkins ............... H04L 63/0876 |
| 10,091,195 | B2 | 10/2018 | Lindemann |
| 10,158,489 | B2 | 12/2018 | Shastri et al. |
| 10,223,520 | B2 | 3/2019 | Oberheide et al. |
| 10,237,070 | B2 | 3/2019 | Lindemann |
| 10,469,490 | B2 | 11/2019 | Nowak et al. |

(Continued)

FOREIGN PATENT DOCUMENTS

| CA | 3025198 C | * 8/2021 | ............ G06F 21/41 |
| CN | 106559405 B | * 11/2020 | ............ H04L 63/06 |

(Continued)

OTHER PUBLICATIONS

Duo Labs, Cisco. WebAuthn Network Transport. pp 1-31. Sep. 25, 2019.

(Continued)

*Primary Examiner* — Sarah Su
(74) *Attorney, Agent, or Firm* — Wilson Sonsini Goodrich & Rosati

(57) ABSTRACT

Systems and methods for cryptographic authentication are provided. A transport service may establish a connection with a login device, where a user is attempting to log in via a web browser. The login device may display a graphical code that encodes a unique URL provided by the transport service. A user may use an authenticator device to image the graphical code. A browser within the authenticator device may be opened and access the URL. The transport service may utilize the authenticator device to perform a proximity-based authentication.

20 Claims, 10 Drawing Sheets

(56) References Cited

U.S. PATENT DOCUMENTS

| | | | |
|---|---|---|---|
| 10,504,103 | B2 | 12/2019 | DeSoto et al. |
| 2011/0219427 | A1 | 9/2011 | Hito et al. |
| 2012/0254429 | A1* | 10/2012 | Feng .................... H04L 67/564 |
| | | | 709/225 |
| 2013/0014243 | A1* | 1/2013 | Chen .................... H04L 67/561 |
| | | | 726/8 |
| 2014/0173125 | A1 | 6/2014 | Selvanandan |
| 2014/0223532 | A1* | 8/2014 | Satoh ................. H04L 63/0815 |
| | | | 726/7 |
| 2015/0012640 | A1* | 1/2015 | Toksvig ................. H04W 4/21 |
| | | | 709/224 |
| 2015/0271164 | A1 | 9/2015 | Hamid |
| 2016/0087957 | A1 | 3/2016 | Shah et al. |
| 2016/0219039 | A1* | 7/2016 | Houthooft .......... H04L 63/0815 |
| 2017/0337542 | A1 | 11/2017 | Kim et al. |
| 2018/0114004 | A1 | 4/2018 | Hamid |
| 2018/0176272 | A1* | 6/2018 | Zur ...................... H10K 85/655 |
| 2019/0132316 | A1 | 5/2019 | Gramza et al. |
| 2019/0222424 | A1 | 7/2019 | Lindemann |
| 2019/0253404 | A1 | 8/2019 | Briceno et al. |
| 2019/0281028 | A1* | 9/2019 | Gillan .................. H04L 9/3271 |
| 2019/0364032 | A1 | 11/2019 | Stohr et al. |
| 2019/0372993 | A1* | 12/2019 | Dunjic .................... H04L 63/10 |
| 2020/0092272 | A1* | 3/2020 | Eisen ................. H04L 63/0869 |
| 2021/0044558 | A1* | 2/2021 | Eisen ...................... H04L 51/23 |
| 2021/0243595 | A1* | 8/2021 | Buck ..................... H04W 12/37 |
| 2022/0046415 | A1* | 2/2022 | Chiang ............. H04L 63/0853 |
| 2022/0329579 | A1* | 10/2022 | Grinman .............. H04L 9/3247 |
| 2023/0125139 | A1* | 4/2023 | Luo ....................... H04L 9/3247 |
| | | | 726/4 |
| 2023/0216850 | A1* | 7/2023 | Pasirstein ............... H04L 63/18 |
| | | | 726/4 |
| 2024/0356906 | A1* | 10/2024 | Rathore ................. H04L 63/08 |

FOREIGN PATENT DOCUMENTS

| | | | | |
|---|---|---|---|---|
| JP | 2015213307 | A | 11/2015 | |
| JP | 2015532984 | A | 11/2015 | |
| JP | 2019061688 | A | 4/2019 | |
| JP | 2019129385 | A | 8/2019 | |
| JP | 2019159522 | A | 9/2019 | |
| JP | 2019179508 | A | 10/2019 | |
| JP | 2019194797 | A | 11/2019 | |
| KR | 20140059382 | A | 5/2014 | |
| KR | 20180006338 | A | 1/2018 | |
| WO | WO-2010136830 | A1 | 12/2010 | |
| WO | WO-2013101358 | A1 | 7/2013 | |
| WO | WO-2015162550 | A1 | 10/2015 | |
| WO | WO-2018083604 | A1 * | 5/2018 | ............. G06Q 20/32 |
| WO | WO-2018111858 | A1 | 6/2018 | |
| WO | WO-2021212001 | A1 * | 10/2021 | ......... H04L 63/0492 |
| WO | WO-2022151974 | A1 * | 7/2022 | |

OTHER PUBLICATIONS

PCT/US2021/027732 International Search Report & Written Opinion dated Aug. 9, 2021.

EP21789460.9 Extended European Search Report dated May 8, 2024.

* cited by examiner

SYSTEMS AND METHODS FOR CRYPTOGRAPHIC AUTHENTICATION

CROSS-REFERENCE TO RELATED APPLICATIONS

This application is a continuation of International Application No.: PCT/US2021/027732, filed Apr. 16, 2021, which claims the benefit of U.S. Provisional Application No. 63/011,775, filed Apr. 17, 2020, the entire content of which are incorporated herein by reference in its entirety.

BACKGROUND OF THE INVENTION

Authentication to access one or more online resource is important to prevent identity theft or other types of theft. Online service providers have started adding more layers of security to verify an individual's identity. In one example, FIDO ('Fast Identity Online') authentication may be utilized to authenticate an individual. Other types of proximity-based authentication may be used.

However, certain devices may not be able to support FIDO authentication or other types of proximity-based authentication. In some instances, this type of authentication may require a type of hardware that the device does not have. In other instances, the device may have software or other applications that may restrict the use of certain components or hardware that may be required for such an authentication. This may prevent a user from using particular devices to be able to access an online resource.

SUMMARY OF THE INVENTION

A need exists for improved methods of systems and methods for cryptographic authentication. A further need exists for systems and methods that may allow a user to access an online resource via a device, even if that device does not typically support the type of authentication (e.g., FIDO authentication, proximity-based authentication).

Systems and methods are provided that may allow the use of an authenticator device to perform a type of authentication that is not supported by a login device. For instance, a user may wish to access an online resource via the login device, but the login device may not support FIDO authentication. The user may use an authenticator device to scan a graphical code displayed on the login device. The graphical code may allow the user to open a browser or application on the authenticator device that may allow the authenticator device to perform the authentication (e.g., FIDO authentication). Confirmation of the authentication may be provided to a host of the resource, and the user may be allowed to access the resource on the login device.

Aspects of the invention are directed to a method for providing authentication comprising: providing a unique URL (uniform resource locator) to a login device, wherein said URL is configured to be encoded into a graphical code that is to be displayed on the login device; establishing a connection with an authenticator device, wherein the connection is provided when the authenticator device images the graphical code displayed on the login device, and accesses the URL that is encoded into the graphical code; and communicating with the authenticator device that performs a proximity-based authentication.

In an aspect, a method for providing authentication is provided. The method comprises: generating a unique URL, wherein the URL is encoded into a graphical code that is to be rendered on a login device for accessing a resource provided by a service provider; establishing a network connection between the login device and a user device using the unique URL, wherein the network connection is established when the user device images the graphical code displayed on the login device, and accesses the URL that is encoded into the graphical code; and communicating with the user device that performs a proximity-based authentication.

In some embodiments, the graphical code is QR code. In some embodiments, the unique URL is provided to the login device via a web socket connection. In some embodiments, the graphical code is provided to the login device via a web socket connection. In some embodiments, the graphical code is rendered within a native application on the login device. In some cases, the graphical code is generated by the native application.

In some embodiments, the network connection between the login device and the user device is a web socket connection. In some embodiments, the proximity-based authentication comprises a FIDO (Fast IDentity Online) authentication. In some cases, a challenge and response for the FIDO authentication is transmitted via the network connection. For example, the challenge and response are communicated via a native browser of the user device.

In some embodiments, the unique URL is within a network domain of the service provider. In some cases, the unique URL contains a domain name and a unique identifier.

In a related yet separate aspect, a system for providing authentication is provided. The system comprises: a transport service configured to generate a unique URL, wherein the URL is encoded into a graphical code that is to be rendered on a login device for accessing a resource provided by a service provider; and a user device configured to: (i) establish a network connection with the login device using the unique URL, wherein the network connection is established when the user device images the graphical code displayed on the login device, and accesses the URL that is encoded into the graphical code, ii) perform a proximity-based authentication and communicate with the login device via the network connection to transmit a response of the proximity-based authentication.

In some embodiments, the graphical code is QR code. In some embodiments, the unique URL is provided to the login device via a web socket connection. In some embodiments, the graphical code is generated by the transport service and is provided to the login device via a web socket connection. In some embodiments, the graphical code is rendered within a native application on the login device. In some cases, the graphical code is generated by the native application.

In some embodiments, the network connection between the login device and the user device is a web socket connection. In some embodiments, the proximity-based authentication comprises a FIDO authentication. In some cases, a challenge for the FIDO authentication is transmitted via the network connection. For example, the challenge and the response are communicated via a native browser of the user device. In some embodiments, the unique URL is within a network domain of the service provider. In some cases, the unique URL contains a domain name and a unique identifier.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
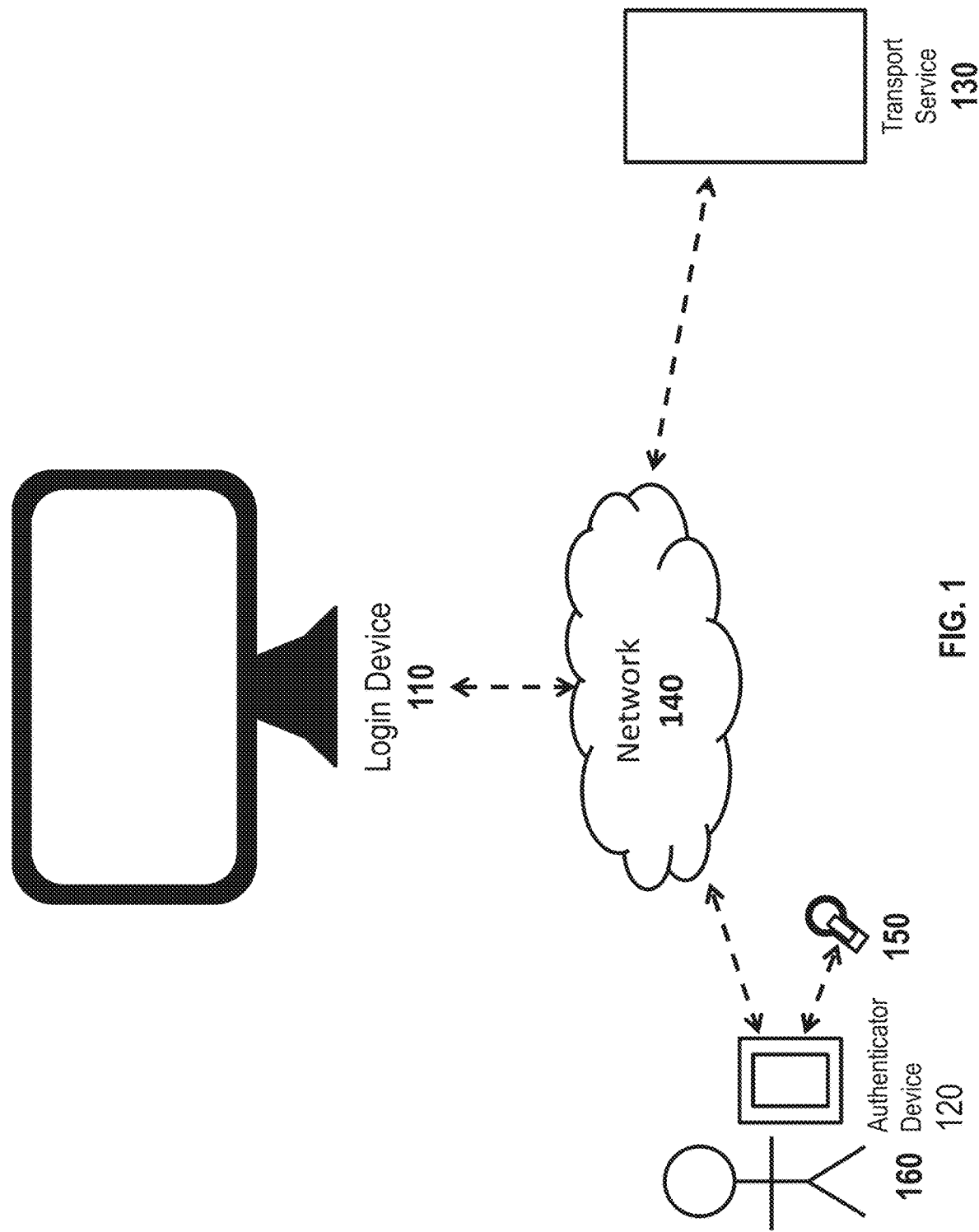
FIG. 1 shows an illustration of a user utilizing an authenticator device to aid in logging in to a login device, in accordance with embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The invention provides systems and methods for cryptographic authentication. Various aspects of the invention described herein may be applied to any of the particular applications set forth below. The invention may be applied as a part of an online service or an authentication system. It shall be understood that different aspects of the invention can be appreciated individually, collectively or in combination with each other.

Systems and methods for authentication are provided, which may permit a user to access an online resource on a login device, that may not support the required level of authentication. In some embodiments, proximity-based authentication, such as FIDO authentication may be required to access an online resource, such as logging into an account or performing particular actions at an online site. In traditional systems, the user may not be able to access the online system using the login device in these scenarios.

Additionally, traditional FIDO authentication protocol requires a relying party (e.g., service provider, application server) using APIs to interact with a user's authenticator. The relying party is composed of a back-end server and a front-end application. During an authentication or registration, the application uses client-side APIs to create and verify user credentials with the authenticator. For example, this may involve passing a cryptographic challenge from the server to the authenticator, and returning the authenticator's response to the server for validation. The back-end server stores the user's public key credential and account information. During authentication or registration, the server generates a cryptographic challenge in response to a request from the application. It then evaluates the response to the challenge. A FIDO authenticator generates user credentials. A user credential has both a public and a private key component. The public key is shared with the application service, while the private key is kept secret by the authenticator.

An authenticator can be part of the user's device, or an external piece of hardware or software. In a traditional FIDO registration process, when a user is signing up for an account on a website, the authenticator generates a new key pair that can only be used on the application service (i.e., relying party service). The public key and an identifier for the credential may be stored with the server. In a traditional FIDO authentication process, when a user returns to the service on a new device, or after their session expires, the authenticator may provide proof of the user's private key. It does this by responding to a cryptographic challenge issued by the server. To verify the identity of the user, some types of authenticator use biometrics such as fingerprints or facial recognition, or alternatively a PIN. However, the pairing or binding process in the traditional FIDO protocol can be cumbersome. For example, the pairing or binding process may require USB, near field communications (NFC), Bluetooth (BLE) on the authenticator device. Moreover, there lacks an omni-channel to support FIDO and the current FIDO technologies lack of a network transport with adequate phishing resistance.

The systems and methods herein may provide a transport service serving as a proxy between the authenticator device and the relying party application (e.g., browser, online resources) and allow the user to perform the proximity-based authentication using the authenticator device, which would enable the user to access the online resource at the login device upon confirmation of authentication. The login device may display a graphical code, such as a QR code. The QR code may have a unique URL encoded therein.

The URL may be a unique URL of the relying party domain (e.g., network domain). For example, the relying party domain may be a resource at http://www.bank.com/login, and the unique URL may be hosted by www.bank.com/login such as www.bank.com/login?cid=(uuid). The authenticator device may navigate to the secure login URL on the relying party domain to perform FIDO authentication. For example, FIDO authentication may be invoked on the relying party application (e.g., a webpage at the unique URL in a browser, a browser running on a login device) and the challenge is forwarded though the established channel to the authenticator device. The authenticator responds to the challenge and the response is sent back to the relying party application. In this way, the FIDO response is bound to the relying party domain. Because the remote authentication happens on the same domain of the relying party while inherit security of FIDO is still present and the keys are unique, the established channel beneficially eliminates phishing. The URL may be generated by the transport service. The provided authentication method may be compatible with existing FIDO architecture and existing network communication channels with improved security.

The communication channel established between the authenticator device and the relying party application may be a bi-directional connection such that the challenge and response of the FIDO authentication can be transported. The bi-directional connection may use web socket protocol. The protocol may enable a connection between client and server and will keep alive until it is terminated by either party (client or server). Unlike HTTP requires request and response for each connection, the connection established by web socket may permit interactions with lower overhead than HTTP.

The pairing process of the provided authentication method is simplified and enhanced with phishing resistance capability. The authenticator device may capture an image of the QR code and a browser on the authenticator device may be directed to the encoded URL. This may beneficially avoid installing additional authentication application on the authenticator device. The authenticator device may communicate with the relying party application (e.g., browser on the login device) via the bi-directional connection established through transport service which will enable the authenticator device to perform the proximity-based confirmation (e.g., FIDO authentication). Upon confirmation of authentication, the user may be allowed to access the online resource at the login device. This may advantageously allow a user to access the resource at the login device, thereby not sacrificing a desired user interface, while still performing the full required level of authentication, thereby not sacrificing security.

FIG. 1 shows an illustration of a user 160 utilizing an authenticator device 120 to aid in logging in to a login device 110, in accordance with embodiments of the invention.

In some embodiments, a user 160 may wish to access an online resource. A resource may include a service (e.g. online transaction, database access, file transfer, remote access), protected data, a particular computing device, file space, an account, a transaction, or a computing function. Any description herein of a resource may apply to any type of resource or service and vice versa.

A resource may be provided by an online service provider. The online service provider may administer one or more servers to provide various services to the user, such as allowing users to create an online account with the online service provider. An online service provider may be a service provider that have an online portal or an online webpage through which users can open an online account. The term "service provider," herein, may be used interchangeably with "online service provider." The service provider may also be referred to a "relying party" which can be the entity with which a user transaction is attempted (e.g., a website or online service performing user transactions). A service provider may offer any type of resource. For example, an online service provider may be a financial institution (e.g., bank), retailer (e.g., electronic retailer, auction site, etc.), database, educational institution, communication service (e.g., email, messaging), health care service, property management service, file sharing network, cloud computing service, social media service, streaming service, or any other type of service.

A user may be able to create an online account to access an online resource. An online account may be a distinct account that can be created online by a user. An online account can be dedicated to, and/or owned by, a user. User-specific information (e.g., name, address, email, etc.) can be associated with a user's online account. Accordingly, online service providers can identify users by a user's online account with the online service provider. Access to an online account can be protected by associating user credentials, such as a username and accompanying password, of the user to the online account and requiring provision of the user credentials when a user requests access to the online account. Online accounts can be stored in a memory storage of a server.

A user may be registered with an online service provider. A user may be registered when the user has opened an online account with an online service provider. For example, a user can be registered to an online service provider if the user has created an online account with the online service provider.

A user may wish to open an online account with an online service provider for any number of reasons including, for example, to preserve and track a relationship between the user and the online service provider (e.g., financial institutions, educational institutions, etc.), to save frequently used user information (e.g., shipping address) or a history of user activities (e.g., order invoices) with the online service provider (e.g., online retailer), to avoid having to provide redundant information to receive a same or similar service from the online service provider, to conveniently manage a service (e.g., insurance claim) provided by the online service provider (e.g., insurance company) to the user, to engage in social networking services supported by the online service provider (e.g., Facebook®, Instagram®), to take ownership of an online identity (e.g., email) provided by the online service provider (e.g., Gmail®, Outlook®, etc.), and so on.

In some instances, a user may provide highly personal and sensitive services (e.g., providing credit report, bank statement) to an online service provider and vice versa, so it may be in the user and service provider's best interest to have a secure authentication system. In some instances, using traditional passwords may not be sufficient to protect a user account. In some instances, traditional passwords alone may not render an account secure from hackers. Furthermore, user may have a difficult remembering or keeping track of traditional passwords.

In some embodiments, an online resource may use proximity-based authentication in order to provide a user with access to a resource. In order to log in, a user may undergo proximity-based authentication. Any description herein of proximity-based authentication may include any authentication that relies the physical proximity of a user or an object carried by a user (e.g., dongle, smart card, mobile device, any near field communication device, USB, etc.) in order to undergo authentication. In some instances, proximity-based authentication may utilize biometric information of a user (e.g., fingerprint, handprint, eye-scan, facial recognition, gesture recognition, gait recognition, voice recognition, verbal passphrase or password). In some embodiments, direct communication, such a Bluetooth, radio, optical connections, cables, or any other type of direct communication may be utilized for proximity-based authentication. In some instances, specialized hardware, such as fingerprint scanners, iris scanners, cameras, microphones, radio antennas, Bluetooth antennas, USB ports, etc. may be required in order to perform the proximity-based authentication. Any description herein of proximity-based authentication may include FIDO (Fast Identity Online) Authentication and vice versa.

A user 160 may wish to access an online resource of an online service provider at a login device 110. The login device may be any type of device (e.g., mobile device (smartphone, tablet, personal digital assistant), computer (e.g., desktop computer, laptop computer, server computer), smart device/IoT (Internet of Things) device, wearable device (e.g., glasses, wristwatch, armband, headset, etc.), kiosk, ATM (automated teller machine) or any other type of device. The login device may be able to access a network 140, such as a Wide Area Network (WAN, such as the Internet), Location Area network (LAN), telecommunications network (e.g., 3G, 4G, 5G, LTE, etc.), or any other type of network.

The login device may be able to support a web browser, portal, or application that may allow a user to access the online resource. However, in some instances, the login device may not support the proximity-based authentication. For instance, the login device may not have hardware that is required to complete the proximity-based authentication. For example, the login device may be missing a device that may collect required biometric information of the user. In another example, the login device may be missing an antenna or other component that may communicate with a device carried by a user. In a further example, the login device may be lacking software that may enable the proximity-based authentication. In some instances, software or hardware may be provided on the login device that may prevent the proximity-based authentication. For example, the login-device may be Bluetooth-enabled, but security software may be provided on the login device that may prevent the Bluetooth from being utilized in particular ways. For example, the login device may not be capable of performing FIDO authentication, or the particular type of FIDO authentication required by the online service provider in order to access the online resource (e.g., login). In one example, the FIDO authentication, such as FIDO 2.0, may require at least one of the following protocols on the login device, such as USB, near field communications (NFC), Bluetooth (BLE), and so forth.

In such a situation, a user may still wish to user the login device to access the online resource. The systems and methods provided herein may allow the user to user the login device to access the online resource, even if the login device is not enabled for the required authentication process. The provided method may also allow the FIDO challenge to be performed via a secured omni network channel (e.g., native browser application) without requiring additional hardware or software application.

A user may have access to an authenticator device 120. The authenticator device may be capable of performing the required level of authentication. For example, the authenticator device may be capable of performing proximity-based authentication, such as FIDO authentication. The authenticator device may have the required hardware and/or software in order to perform the required authentication. For example, the authenticator device may create a new key pair during registration with an online service and retain the private key, and the public key is registered with the online service. During authentication, the authenticator device proves possession of the private key to the service by signing a challenge, which involves a proximity-based authentication such as providing a fingerprint, entering a PIN, taking a selfie, speaking into a microphone and various others as described above. The authenticator device may not have hardware or software that prevents the required authentication from occurring.

For example, the authenticator device may have a biometric reader that may allow any necessary biometric information of the user to be captured. For example, the authenticator device may have a fingerprint scanner, a palm scanner, an eye scanner, one or more cameras, or one or more microphones that may be used to capture any desired biometric information. The authenticator device may have an antenna, or any type of communication device, that may allow for communication with an object carried by a user that may be required for authentication.

When a user wishes to log into the login device, but the login device does not support the required authentication (e.g., proximity-based authentication), the login device may display a graphical code. Any description of a graphical code may apply to a QR code, barcode (e.g., 1D, 2D, or 3D barcode), series of symbols, icons, images, or any other unique or encodable images, temporal sequence of images or light, and vice versa. The graphical code may be displayed on a screen or other type of display. The graphical code may appear on a web browser, web portal, or any other application on the login device that may be used to access the online resource.

In some embodiments, the graphical code may automatically be displayed at the login device if a detection occurs that the login device does not support the required authentication (e.g., proximity-based authentication). For instance, an online web service or application may automatically detect that the login device does not have a particular type of hardware, or that the type of hardware required is disabled. Similarly, the online web service application may automatically detect that the login device does not have a particular software that allows for the required authentication or that a software is provided that disables the ability the perform the required authentication. In such a situation, the graphical code may automatically pop up on the display (e.g., not require a request by a user for the graphical code). In some instances, instructions may be provided along with the graphical code.

In some situations, a user may make a request for the graphical code to appear. For instance, the user may detect that the login device does not support the required authentication (e.g., proximity-based authentication) and may request the graphical code. The graphical code may be displayed in response to a user request. In some instances, the user may request a graphical code even if the login device does support the required level authentication. In alternative embodiments, the graphical code may not be requested by the user if the login device does support the level of required authentication.

The graphical code may include information encoded therein. The information encoded within the graphical code may be provided by a transport service. The transport service may communicate with an online service provider and/or be part of the online service provider. The transport service may be hosted by the online service provider or by a separate third party. The graphical code may be generated by the transport service or by the online service provider. In one example, the transport service may generate the information (e.g., unique URL) to be encoded in the graphical code and generate the graphical code with the encoded information. The transport service may transmit the QR code to the login device. In another example, the transport service may provide the information that is to be encoded within the graphical code and transmit the information to the online service provider. The online service provider may create and render the graphical code with the encoded information. The login device may display the graphical code that is created by the online service provider. For instance, the transport service may include a software development kit (SDK) or library embedded within a native application (e.g., native browser) of the login device (e.g., ATM), a standalone application callable by other applications, and/or an operating system level callable service. The SDK or library may enable the native application (e.g., browser) to generate and/or render a QR code encoded with the unique URL. In some cases, the SDK may be a downloadable data object distributed or offered by the transport service. The SDK may be integrated or compiled into an application of the service provider such as a browser. The SDK can be a framework linked in application source code development, a library downloaded and included within the relying party application, or integrated in any suitable manner. used within a third party application instance. In some cases, functions such as generating a unique URL of the relying party domain, generating QR code encoding the URL or rendering the QR code may be managed within the relying party application.

The encoded information may be a URL (uniform resource locator). The URL may be a substantially unique URL of the relying party domain (i.e., online service provider). The URL may be for a site that is hosted by the transport service and/or the online service provider. For example, the relying party domain may be a resource at http://www.bank.com/login, and the unique URL may be hosted by www.bank.com/login such as www.bank.com/login?cid=(uuid). In some instances, the transport service may be part of the online service provider or operated by the online service provider. Alternatively, the transport service may be separate from the online service provider and/or operated by a third party.

The authenticator device may be used to capture an image of the graphical code. The authenticator device may have one or more cameras that may be capable of capturing the image of the graphical code. The one or more cameras may be integral to the authenticator device. Alternatively, one or more cameras may be provided as an attachment or add-on.

The authenticator device may have software or application that may be capable of recognizing the graphical code. The authenticator device may be able to access the encoded information within the graphical code. The authenticator device may or may not use specialized software or applications to be able to access the encoded information within the graphical code. A user may or may not need to open an application or software prior to capturing the image of the graphical code or analyzing the image of the graphical code.

The authenticator device may utilize the information encoded within the graphical code in order to perform the authentication process as described above. For example, the information encoded within the graphical code may allow the authenticator device to perform proximity-based authentication with the online service provider, such as FIDO authentication.

In one example, the information encoded within the graphical code may be a unique URL of the online service provider domain. The authenticator device may capture an image of the graphical code. The authenticator device may be able to extract or recognize the URL from the graphical code. The authenticator device may access the URL site via a native application such as browser or operating system level application that operates on the authenticator device. For example, the authenticator device may navigate to the secure login URL on the relying party domain to perform FIDO authentication. This beneficially provides an omni channel for the FIDO challenge that is compatible with any user/provider picked FIDO authenticator.

Via the URL, the authentication process may occur, utilizing the authenticator device. For instance, challenge and response for a full FIDO authentication may occur between the authenticator device. The FIDO authentication may include a registration process where the authenticator device creates a new and unique public/private cryptographic key pair that will be used for authenticating access. The public key is then sent to the online service provider and associated with the user's account. The private key and all other sensitive data related to the proximity-based authentication method (e.g., biometric prints) remain on the local device and never leave it. During the FIDO authentication challenge, the authenticator device is required to prove possession of the private key to the authenticating service by successfully responding to a cryptographic challenge. The private key can only be used after successfully authenticating using the registered authenticator (e.g., by swiping a finger on the fingerprint sensor, entering a PIN, speaking into a microphone, inserting a second—factor device, pressing a button, etc.). The authenticator device then uses the user account identifier provided by the service to select the correct key and cryptographically sign the service's challenge. The signed challenge is sent back to the online service provider, which verifies it with the stored public key and logs in the user. The challenge and signed challenge may be communicated via the bi-directional connection established by the unique URL as described above.

In some cases, the FIDO authentication may require a second—factor device such as a dongle. A dongle 150 is illustrated by way of example only. The authentication may include communication between the authenticator device 120 and a separate device 150. For example, the separate device may be a dongle, smart card, mobile device, or any other type of device, such as those described elsewhere herein. The communication may occur via hard-wired connection or via wireless communications. The wireless communications may be direct wireless communications, such as over Bluetooth, radio, optical connections, or any other direct communication techniques. The communications may be proximity-based, such that the separate device may need to be within a proximity range of the authenticator device. Any other type of device may be used to aid in the proximity-based authentication, such as devices that may be integral to the authenticator device. For example, biometric readers may be integrated into the authenticator device or may be provided separately from the authenticator device but rely on proximity-based communications (e.g., hardwired or direct wireless communications).

The authentication may then be confirmed. When the authentication process is complete, the online service provider may confirm that the user is the authenticated individual. Optionally, the online service provider may also confirm that the user is authorized to access the online resource. When the user is confirmed to be authenticated and/or authorized, the user may be permitted to access the online resource via the login device.

By establishing the network connection between the authenticator device and the native application running on the login device using the unique URL, the provided method may advantageously permit a user to access an online resource via the login device even when the login device does not support the authentication process required to access the online resource. This may allow the user to have the benefit of using the user interface of the login device, while also permitting robust authentication. For example, a user may wish to access the online resource via the login device rather than the authenticator device, if the login device has a more user-friendly interface. For example, the login device may have a larger screen, easier-to-use keyboard or other interactive devices (e.g., mouse, touchpad, scanner, trackball, touchscreen, etc.), or may be located in a more comfortable environment (e.g., at a seat, kiosk, pod, etc.).

Figure 2:
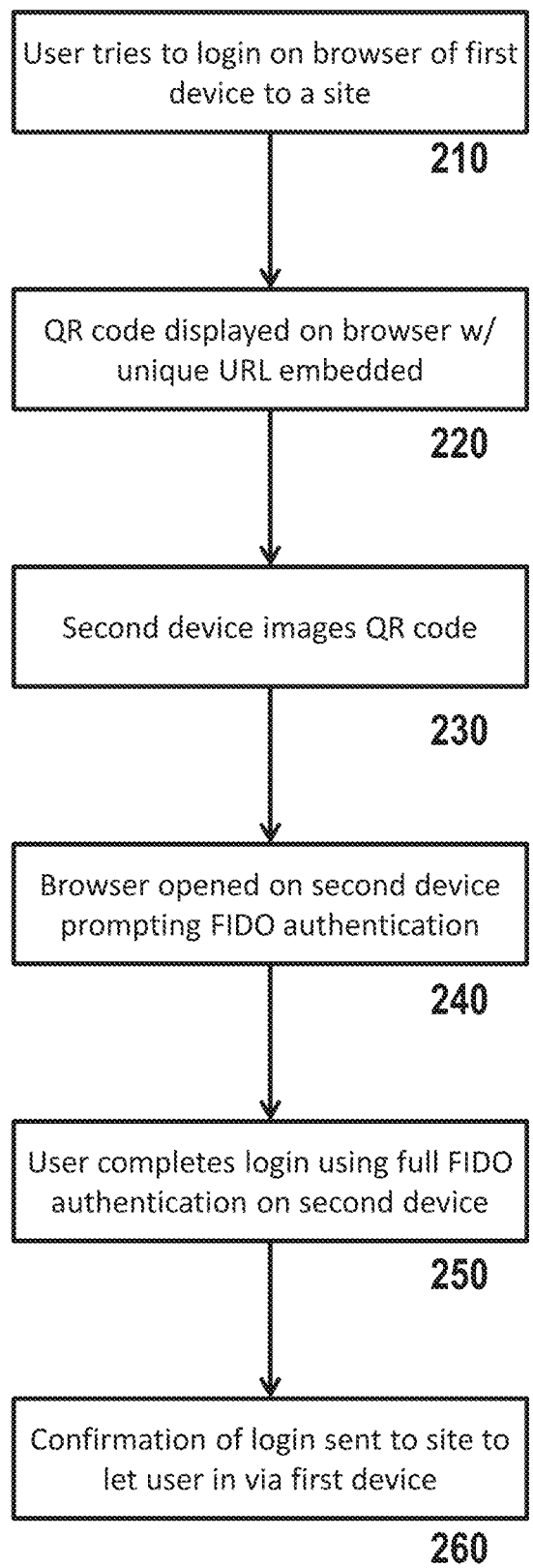
FIG. 2 shows an exemplary process for logging into a first device with aid of a second device, in accordance with embodiments of the invention.

FIG. 2 shows an exemplary process for logging into a first device with aid of a second device, in accordance with embodiments of the invention.

A user may initially attempt to access a resource on a site at a first device 210. The request to access a resource may include logging into a site hosted by an online service provider. The request to log in may be the request to access the resources that are available when the user has logged in. In some instances, even after a user has logged in, requests for resources may be made. For example, additional verification or authentication may be required when the user wishes to take certain actions.

For example, a user may log into a financial institution site. The user may be able to perform certain activities on the site without requiring additional information. However, if the user wishes to engage in a large financial transaction (e.g., transaction that exceeds a threshold amount), the user may require further authentication. Any description herein of logging in or accessing a resource may include any type of activity by the user that may require further authentication, such as performing a large transaction. In some instances, authentication may be required for different activities or at different stages of a transaction. Any description herein of utilizing the authenticator device to aid in proximity-based authentication may refer to initially logging into a site, or any step that may occur after a user has logged into a site that may require further authentication.

In some cases, the user may attempt to access the resource via a native application such as a native browser of the login device. The login device may have a web browser that may serve as an online portal to a resource provided by an online service provider. Any description herein of a browser may apply to an application that may be provided on the login device to access the resource provided by the online service provider. The login device may or may not require any specialized software or downloads to access the resource provided by the online service provider (e.g., web site, portion or step hosted by online service provider).

After a user has requested access to a resource at the login device, a graphical code (e.g., QR code), may be displayed at the login device 220. The graphical code may be displayed on a native application such as a web browser of the login device. Alternatively, the graphical code may be displayed on other applications of the login device. The graphical code may be displayed on the same application or software that is used to request the resource from the online service provider. For example, if a user uses a web browser to attempt to log in to a site hosted by the online service provider, the web browser may be used to display the graphical code.

The graphical code may have embedded information. For example, a QR code may have a URL encoded therein. The URL may be a unique URL of the relying party domain (e.g., online service provider domain) as described above. The URL and the QR code may be generated by a transport service in response to a request from the online service provider. Alternatively, the QR code may be generated by an embedded SDK of the web browser to encode the URL that is generated by the transport service.

A second device may be used to image the graphical code 230. The second device may be separate from the first device. The second device may be capable of operating independently of the first device. The second device may have its own set of applications that may operate independently from the first device. The second device may be able to operate without requiring being in proximity of the first device. In one example, a second device may be a mobile device, such as a smart phone, tablet, laptop, or personal digital assistant. The second device may be a wearable device, such as any wearable device described elsewhere herein.

In some embodiments, both the first device and second device may be network-enabled. The first device and the second device may be capable of communicating with a wide area network, such as the Internet. The first device and/or second device may be capable of communicating with a telecommunications network, such as those described elsewhere herein. The second device may optionally have hardware or software that may enable proximity-based authentication, such as FIDO authentication. The second device may be the same as the authenticator device as described above. The first device may optionally not have hardware or software that allows for proximity-based authentication. In some instances, the second device does not have hardware or software that prevents proximity-based authentication. In some instances, the first device does have hardware or software that prevents proximity-based authentication.

In one example, the first device may be a kiosk, desktop computer, laptop computer, automatic teller machine (ATM), vending machine, or other device through which a user may wish to access an online resource. Any description herein of a first device or login device, may apply to any type of first device as described, including, but not limited to, an ATM. The second device may be a smart phone, tablet, laptop, personal digital assistant, wearable device, or other device that may be capable of proximity-based authentication. The second device may or may not be smaller or more mobile than the first device.

The second device may be capable of decoding the information embedded within the graphical code. The image of the graphical code may be used to identify the embedded information (e.g., URL). The second device may or may not use specialized software or applications in order to identify the embedded information. In another example, the identification may occur locally using processors on-board the second device. Alternatively, the second device may communicate with a remote resource in order to identify the information embedded in the graphical code.

Identifying the embedded information may cause a browser (or other native application) to be opened that may prompt the proximity-based authentication (e.g., FIDO authentication) 240. For instance, the embedded information may be a URL. The browser may be automatically opened in the second device and may be directed to the URL encoded in the graphical code. The URL encoded in the graphical code may be hosted by a transport service and/or online service provider. The transport service may be operated by an online service provider, and the URL may direct the user to a unique location hosted or operated by the online service provider (e.g., unique URL of the online service provider domain). In another example, the transport service may be operated by a third party separate from the online service provider, and the URL may direct the user to a unique location hosted or operated by the transport service separate from the online service provider.

The URL that is encoded in the graphical code may be substantially unique. Any description herein of a unique URL may refer to any URL that is substantially unique, or unique for the purposes that currently no other graphical codes may embed the same URL. The unique URL may be generated using a randomizer or any other sort of algorithm or technique. The URL may be sufficiently unique so that no other user will be shown a QR code with that same URL while the code/URL is still valid. The unique URL is within the online service provider domain. For example, the URL may contain the domain name and a unique identifier. For instance, the relying party domain may be a resource at www.bank.com/login, and the unique URL may be hosted by www.bank.com/login such as www.bank.com/login?cid=(uuid).

In some instances, a code/URL may be valid within a pre-determined time window or expire after a predetermined amount of time. In some instances, when a URL has been used, it may not be used again for an extended period of time (e.g., at least an hour, at least a day, at least a week, at least a month, etc.).

The browser or application opened within the second device may prompt the authentication process. For example, instructions may be displayed to the user how to move forward with the authentication (e.g., respond to a FIDO challenge). If devices that are integral to the second device or connected to (or in communication with) the second device are required, such devices may or may not be automatically initialized or primed to perform their part in the authentication process.

A user may then undergo and complete the authentication process using the proximity-based authentication (e.g., FIDO authentication) using the second device 250. For instance, the FIDO challenge and signed challenge as described above may be communicated between the first device and the second device via the network connection between the browser application on the first device and the browser application on the second application. The signed response is sent back to the relying party application (e.g., browser on the first device) such that the FIDO response is bound to the relying party domain. Because the FIDO authentication happens on the same domain of the relying party while inherit security of FIDO is still present and the keys are unique, the established channel beneficially eliminates phishing. Optionally, instructions may be provided in a step by step manner that may guide the user through the authentication process. The instructions may appear on the second device. The instructions may appear on a user interface, such as the browser, of the second device. The second device may communicate with the transport service and/or online service provider in order to complete the authentication process.

A confirmation of the authentication completion may be provided to the online service provider in order to allow the user to access the resource at the first device 260. In some cases, the transport service may assist in confirming that the authentication has been completed and verified. For instance, the transport service may relay challenges to the user and receive responses from the second device. The transport service may have access or may directly confirm that the user is authenticated using the authentication process. Alternatively, the transport service may relay challenges and responses between the second device and the online service provider. In some instances, the online service provider may have the information in order to complete the authentication process (e.g., public key, user account identifier, etc.). The transport service may merely relay information between the second device and the online service provider and the online service provider may make the determination whether the user has been authenticated.

In some instances, a message or confirmation may be displayed on the second device when the authentication is confirmed. Alternatively, no message or confirmation is displayed on the second device. In some instances, the first device may show some form of confirmation of authentication and/or the user may be granted access to the requested resource (e.g., login, transaction, etc.).

If the user undergoes the authentication process but is not authenticated (e.g., fingerprint doesn't match, dongle isn't read or seems to be an incorrect match, etc.), the user may be prompted to try again. The user may be guided through steps to attempt to log in again, or may be provided with troubleshooting tips. In some instances, the user may be instructed to use a different device to be authenticated (e.g., a device different from the second device or first device). In some instances, if the number of attempts exceeds a predetermined threshold, the user may be locked out for a period of time. The number of attempts or suggestions to the user may be determined by the online service provider and may optionally differ based on the service provider.

Figure 3:
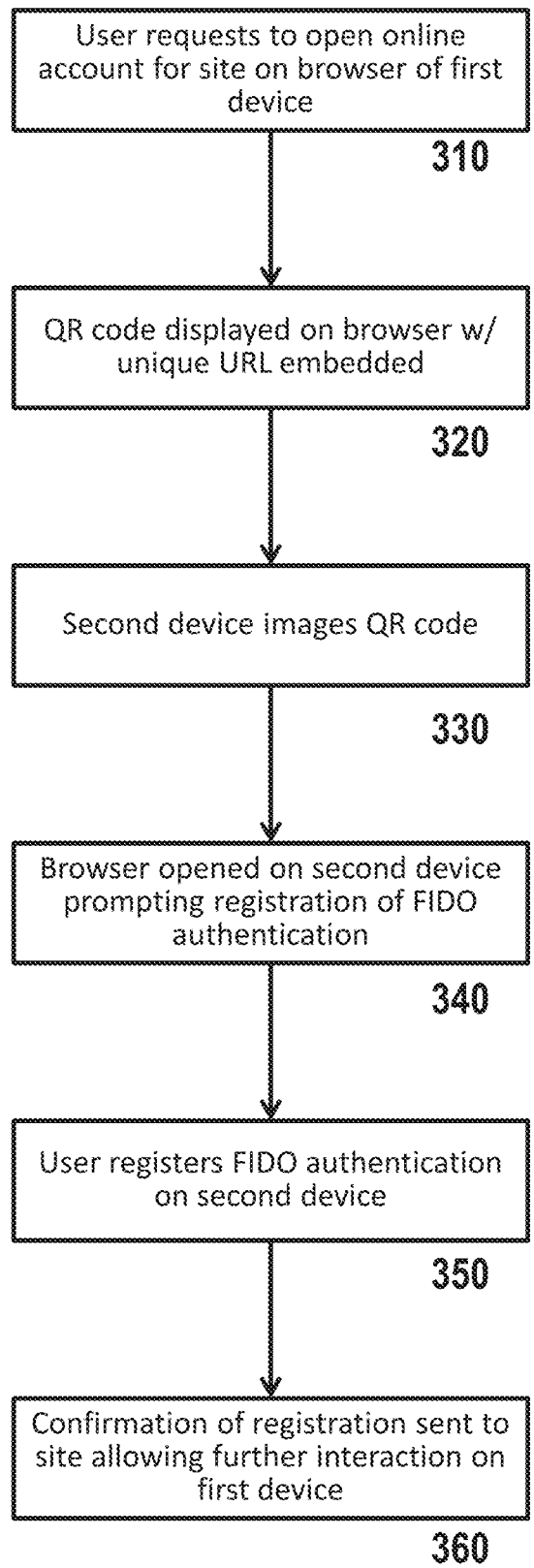
FIG. 3 shows an exemplary process for registering an account at a first device with aid of a second device, in accordance with embodiments of the invention.

FIG. 3 shows an exemplary process for registering an account at a first device with aid of a second device, in accordance with embodiments of the invention.

A user may initially attempt to access to register an account for an online service provider at a first device 310. The request to register may include creating a new account at a site hosted by an online service provider. The request to register an account may allow a user to create a new account to log in and access desired resources that are available when the user has logged in. In some instances, even after a user has created an account, requests for resources may be made that may require registering an authentication device or collecting information about the user or user devices. For example, additional verification or authentication may be required when the user wishes to take certain actions. Even if a user has already created an account, if the user not already taken steps that require additional verification, the user may be required to register for the additional verification.

For example, a user may wish to create an account for a financial institution site. In order to log into the site, the user may need to undergo a proximity-based authentication process (e.g., FIDO authentication). As part of the registration process, the user may need to provide proximity-based information in order to allow for subsequent proximity-based authentication. For example, if the user needs to provide biometric information in order to log in, the user may be required to provide an initial set of biometric information that may be used as a point of comparison for when the user logs in. For example, if the authentication requires facial recognition, the user may be required to take one or more pictures of the user in order to provide a baseline for the subsequent authentication. In another example, if a user has a dongle or other near-field-communication device, the user may need to register or initially link the device in order to allow for subsequent authentications. As described above, the authenticator device may create a new key pair during registration with an online service provider and retain the private key, the public key is registered with the online service provider. In some cases, during registration, the online service provider may select which locally available authentication mechanism it will accept. For example, users can register their mobile device and select its embedded fingerprint sensor as the local authentication means used to authenticate them to the online service. Other authentication mechanisms including looking at the camera, speaking into the microphone, or entering a PIN may also be selected. Once registered and accepted by the online service, users can authenticate to the online service using the local authentication action registered and respond to the FIDO challenge using the private key.

In another example, the user may already have an account at the financial institution site. The user may be able to perform certain activities on the site without requiring additional information. However, if the user wishes to engage in a large financial transaction (e.g., transaction that exceeds a threshold amount), the user may require further authentication. Any description herein of logging in or accessing a resource may include any type of activity by the user that may require further authentication, such as performing a large transaction. In some instances, authentication may be required for different activities or at different stages of a transaction. If a user has not previously registered or provided information required to undergo proximity-based authentication, the user may be requested to do so before performing the activity that requires the additional information. Any description herein of utilizing the authenticator device to aid in registering for proximity-based authentication may refer to initially creating an account for the site, or any step that may occur after a user has logged into a site that may require further authentication.

Furthermore, the user may attempt to register for the account and/or authentication process via a browser at the first device. The first device may have a web browser that may serve as an online portal to a resource provided by an online service provider. Any description herein of a browser may apply to an application that may be provided on the login device to access the resource provided by the online service provider and/or allow for registration for an account with the online service provider. The first device may or may not require any specialized software or downloads to access the resource provided by the online service provider (e.g., web site, portion or step hosted by online service provider) and/or register for an account with the online service provider.

After a user has requested opening an account, a graphical code (e.g., QR code), may be displayed at the first device 320. The graphical code may be displayed on a web browser of the first device. Alternatively, the graphical code may be displayed on an application of the first device. The graphical code may be displayed on the same application or software that is used to request the resource from the online service provider. For example, if a user uses a web browser to attempt to log in to a site hosted by the online service provider, the web browser may be used to display the graphical code.

The graphical code may have embedded information. For example, a QR code may have a URL encoded therein as described above.

A second device may be used to image the graphical code 330. The second device may be separate from the first device. The second device may be capable of operating independently of the first device. The second device may have its own set of applications that may operate independently from the first device. The second device may be able to operate without requiring being in proximity of the first device. In one example, a second device may be a mobile device, such as a smart phone, tablet, laptop, or personal digital assistant. The second device may be a wearable device, such as any wearable device described elsewhere herein.

In some embodiments, both the first device and second device may be network-enabled. The first device and the second device may be capable of communicating with a wide area network, such as the Internet. The first device and/or second device may be capable of communicating with a telecommunications network, such as those described elsewhere herein. The second device may optionally have hardware or software that may enable proximity-based authentication, such as FIDO authentication. The first device may optionally not have hardware or software that allows for proximity-based authentication. In some instances, the second device does not have hardware or software that prevents proximity-based authentication. In some instances, the first device does have hardware or software that prevents proximity-based authentication.

In one example, the first device may be a kiosk, desktop computer, laptop computer, ATM, or other device through which a user may wish to access an online resource. The second device may be a smart phone, tablet, laptop, personal digital assistant, wearable device, or other device that may be capable of proximity-based authentication. The second device may or may not be smaller or more mobile than the first device.

The second device may be capable of identifying the information embedded within the graphical code. The image of the graphical code may be used to identify the embedded information (e.g., URL). The second device may or may not use specialized software or applications in order to identify the embedded information. In another example, the identification may occur locally using processors on-board the second device. Alternatively, the second device may communicate with a remote resource in order to identify the information embedded in the graphical code.

Identifying the embedded information may cause a browser (or other application) to be opened that may prompt the registration of the proximity-based authentication (e.g., FIDO authentication) 340. For instance, the embedded information may be a URL. The browser may be automatically opened in the second device and may be directed to the URL encoded in the graphical code. The URL encoded in the graphical code may be hosted by a transport service and/or online service provider. The URL may have the same domain as the transport service and/or online service provider. In some cases, the URL may be a unique URL of the relying party domain. For example, the relying party domain may be a resource at www.bank.com/login, and the unique URL may be hosted by www.bank.com/login such as www-.bank.com/login?cid=(uuid). The transport service may be operated by an online service provider, and the URL may direct the user to a unique location hosted or operated by the online service provider. In another example, the transport service may be operated by a third party separate from the online service provider, and the URL may direct the user to a unique location hosted or operated by the transport service separate from the online service provider.

The URL that is encoded in the graphical code may be substantially unique. Any description herein of a unique URL may refer to any URL that is substantially unique, or unique for the purposes that currently no other graphical codes may embed the same URL. The unique URL may be generated using a randomizer or any other sort of algorithm or technique. The URL may be sufficiently unique so that no other user will be shown a QR code with that same URL while the code/URL is still valid. In some instances, a code/URL may expire after a predetermined amount of time. In some instances, when a URL has been used, it may not be used again for an extended period of time (e.g., at least an hour, at least a day, at least a week, at least a month, year, etc.).

The browser or application opened within the second device may prompt the registration process. For example, instructions may be displayed to the user how to move forward with the registration. If devices that are integral to the second device or connected to (or in communication with) the second device are required, such devices may or may not be automatically initialized or primed to perform their part in the registration process.

A user may then undergo and complete the registration process for the proximity-based authentication (e.g., FIDO authentication) using the second device 350. Optionally, instructions may be provided in a step by step manner that may guide the user through the registration process. The instructions may appear on the second device. The instructions may appear on a user interface, such as the browser, of the second device. The second device may communicate with the transport service and/or online service provider in order to complete the registration process.

A confirmation of the registration completion may be provided to the online service provider in order to allow the user to complete creating an account for the site, at the first device 360. In some instances, the registration completion may permit the user to complete the creation of the account and log into the account. In some embodiments, a transport service may confirm that the registration has been completed. For instance, the transport service may provide challenges to the user and receive responses from the second device. The transport service may have access or may directly confirm that the user has completed registration, sufficiently providing the proximity-based information required for subsequent proximity-based authentication (e.g., FIDO authentication). Alternatively, the transport service may relay communications between the second device and the online service provider. In some instances, the online service provider may have the information in order to complete the registration process. The transport service may merely relay information between the second device and the online service provider and the online service provider may make the determination whether the registration for the proximity-based authentication has been completed.

In some instances, a message or confirmation may be displayed on the second device when the registration is confirmed. Alternatively, no message or confirmation is displayed on the second device. In some instances, the first device may show some form of confirmation of registration and/or the user may be granted an account.

If the user undergoes the registration process but errors occur (e.g., fingerprints aren't clear, dongle doesn't register or is in an unexpected format, etc.), the user may be prompted to try again. The user may be guided through steps to attempt to register again, or may be provided with troubleshooting tips. In some instances, the user may be instructed to use a different device to be registered (e.g., a device different from the second device or first device). In some instances, if the number of attempts exceeds a predetermined threshold, the user may be locked out for a period of time. The number of attempts or suggestions to the user may be determined by the online service provider and may optionally differ based on the service provider.

Any description herein of an authentication process may also apply to a registration process. For example, any description herein of how an authentication process may occur utilizing a second device may also apply to a registration system that utilizes a second device to perform the proximity-based authentication. Any details herein of how an authentication process may occur may also similarly apply to a registration process.

Figure 4:
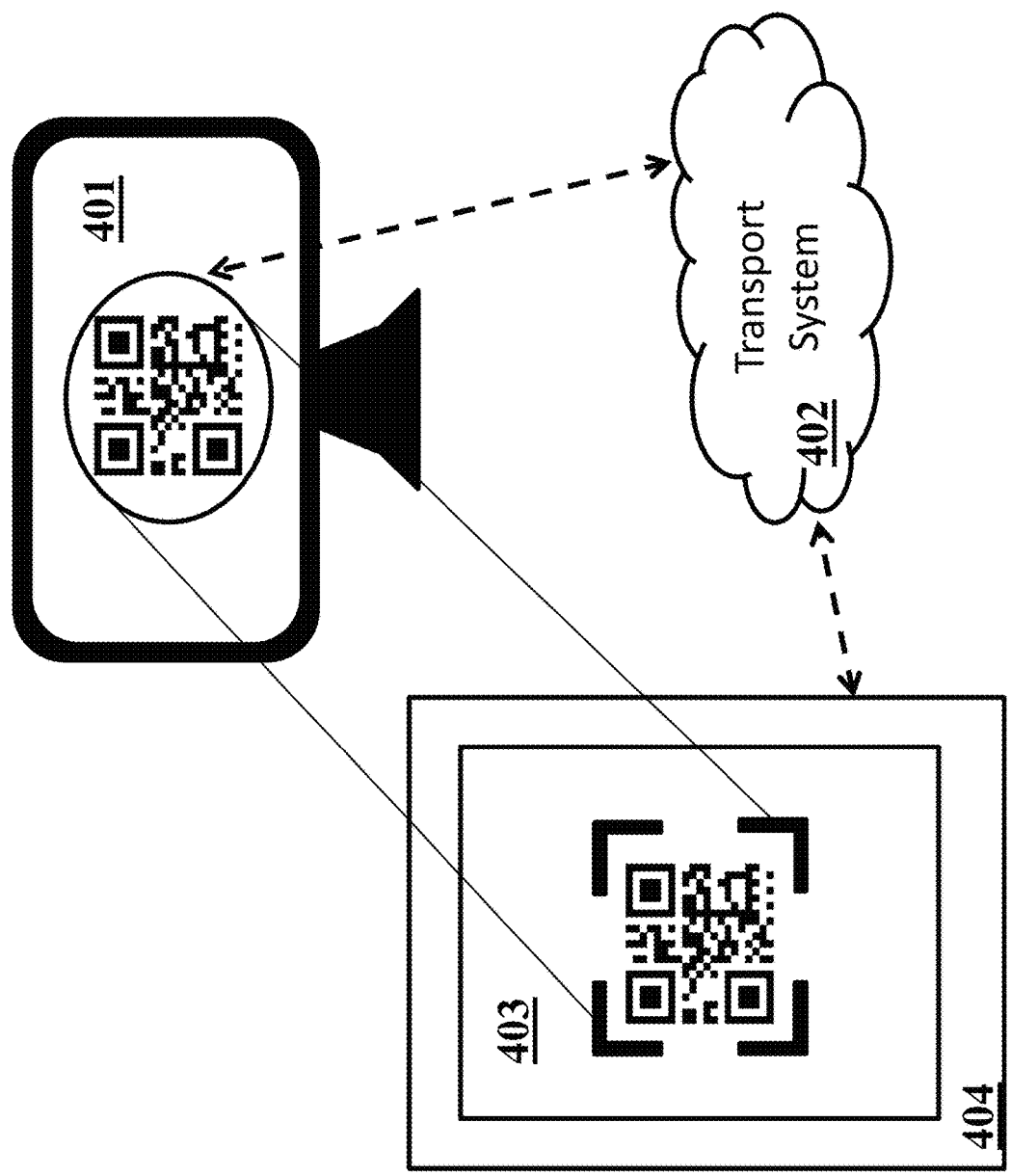
FIG. 4 shows a schematic diagram of a second device capturing a graphical code during an authentication session, in accordance with embodiments of the invention.

FIG. 4 shows a schematic diagram of a second device 404 capturing a graphical code during an authentication session, in accordance with embodiments of the invention.

The authentication session may be hosted by a server on one or more interactive webpages, and accessed by one or more users. The second device 404 (e.g., authenticator device) can be used to scan a visual graphical code such as a QR code displayed on a first device 401 (e.g., login device). The QR code, or any other graphical codes, can be provided to the first device by a transport system 402.

The second device 404 and the first device 401 may be separate devices. The second device and first device may be capable of operating independently of one another. Alternatively, the second device 404 and the first device 401 may be the same device. In some instances, the first and second devices may be capable of communicating over a network independently of one another. The first or second devices may or may not be registered with a transport system. In some instances, the systems and methods provided herein may be able to function without registering the first and second devices. The first and second devices may be capable of communicating with the transport system over a network.

The second device 404 may be a mobile device (e.g., smartphone, tablet, pager, personal digital assistant (PDA)), a computer (e.g., laptop computer, desktop computer, server), or a wearable device (e.g., smartwatches), or any other device as described elsewhere herein. A second device can also include any other media content player, for example, a set-top box, a television set, a video game system, or any electronic device capable of providing or rendering data. The second device may optionally be portable. The second device may be handheld. The second device may be a network device capable of connecting to a network, such as a local area network (LAN), wide area network (WAN) such as the Internet, a telecommunications network, a data network, or any other type of network.

The second device 404 may comprise memory storage units which may comprise non-transitory computer readable medium comprising code, logic, or instructions for performing one or more steps. The second device may also store locally the public/private key and/or other authentication information (e.g., biometric data) generated during registration. The user device may comprise one or more processors capable of executing one or more steps, for instance in accordance with the non-transitory computer readable media. The second device may comprise a display showing a graphical user interface. The second device may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device. The second device may be capable of executing software or applications provided by one or more authentication systems. One or more applications may or may not be related to reading codes such as graphical codes.

In some instances, the software and/or applications may allow the user to scan graphical authentication indicia such as a QR code displayed on another device or the same device, and transmit authentication data between the second device 404 and the transport system 402 during an authentication session. The software and/or application may have been registered with the transport system by the user. Optionally, the software and/or application need not be registered with the transport system, and only the authenticator device or login device may be registered with the transport system. Optionally, both the software and the authenticator device or login device can be registered with the transport system. Optionally, the software and/or application may be configured to collect authentication data (e.g., image capture characteristics, time of capture, etc.), and encrypt the data before sending them to the transport server an authentication session. As previously described, in some instances, no devices or software applications may be required to be pre-registered with the transport service.

The second device 404 may be, for example, one or more computing devices configured to perform one or more operations consistent with the disclosed embodiments. For instance, the second device may be useful for proximity-based authentication and/or registration. The second device may be capable of optically detecting one or more visual element, such as a visual code. The user device may utilize an optical detection apparatus. The optical detection apparatus may optically read or scan a visual element. In some embodiments, the user device may comprise an imaging device 403 which is configured to capture a visual graphical element, such as a QR code, text, a picture, a sequence thereof, or any other forms of graphical authentication indicia that is being displayed on first device 401. The imaging device can include a hardware and/or software element. In some embodiments, the imaging device may be a hardware camera sensor operably coupled to the user device. For example, the camera sensor can be embedded in the second device. Alternatively, the imaging device may be located external to the second device, such as connected via cable or wirelessly, and image data of the graphical element may be transmitted to the second device via communication means as described elsewhere herein. The imaging device can be controlled by applications and/or software configured to scan a visual graphical code. For example, the camera may be configured to scan a QR code. Optionally, the software and/or applications may be configured to activate the camera on the second device to scan the code. In some instances, the camera can be controlled by a processor natively embedded in the second device. Optionally, if the first device 401 and the second device 404 are the same device, the imaging device can comprise a screen capturing software (e.g., screenshot) that can be configured to capture and/or scan a QR code on the screen of the second device 104.

The first device 401 may be configured to display a visual graphical code (e.g. a QR code) to the user. In some embodiments, the QR code may be displayed via an interface such as a webpage, application, program, or any appropriate software. The first device 401 can be a monitor, a computer (e.g., laptop computer, desktop computer), a mobile device (e.g., smartphone, tablet, pager, personal digital assistant (PDA)), a kiosk, an ATM, a smart device, or a vending machine. In some instances, the first device may comprise one or more processors natively embedded in the first device. The first device may optionally be portable. The first device may be handheld.

In some instances, the visual graphical code displayed on the display device 101 and subsequently scanned by imaging device 103 may be a QR code. QR codes are two-dimensional barcodes that encode data by using dark and light modules arranged in a square-like or rectangular shape. QR codes can be optically captured and read by a machine. The barcode may define elements such as the version, format, position, alignment, and timing of the barcode to enable reading and decoding of the barcode. The remainder of the barcode can encode various types of information in any type of suitable format, such as binary or alphanumeric information. The QR code can have various symbol sizes as long as the QR code can be scanned from a reasonable distance by an imaging device. The QR code can be of any image file format (e.g. EPS or SVG vector graphs, PNG, TIF, GIF, or JPEG raster graphics format). The QR code can be based on any of a number of standards. In some instances, a QR code can conform to known standards that can be read by standard QR readers. The information encoded by a QR code may be made up of four standardized types ("modes") of data (numeric, alphanumeric, byte/binary, kanji) or, through supported extensions, virtually any type of data. In some instances, the QR code may be proprietary such that it can be read only by an authenticated application, provided by the authentication system, running on a user device. In some instances, only the authentication system or the authenticated application can encrypt or decrypt the QR code.

The QR code may have information embedded therein. In some instances, specialized software or applications may be required to access the information embedded therein. Alternatively, specialized software or applications may not be required to access the information embedded therein. The second device may be capable of accessing and interpreting the information embedded therein. The second device may be capable of accessing and interpreting the information without requiring network connectivity. The second device may be capable of accessing and interpreting the information locally. Alternatively, the second device may utilize one or more remote resource to access and interpret the embedded information. The second device may require network connectivity to be able to access and interpret the encoded information.

The information embedded therein may comprise a URL. The URL may be hosted by the transport service. The transport service may utilize an online service provider-based website for the URL, or a third party-based website for the URL. The URL may be substantially unique. The URL may be created using a randomizer or any other type of algorithm in order to ensure being substantially unique.

The URL may be encoded into the QR code using any technique known or later developed.

Scanning the QR code may cause the second device to automatically be directed to the site defined by the URL. The second device may automatically open a local browser of the second device and be directed to the URL. Alternatively, the second device may automatically open an application on the second device and be directed to the URL. A user may or may not be prompted to continue in order to access the URL.

Figure 5A:
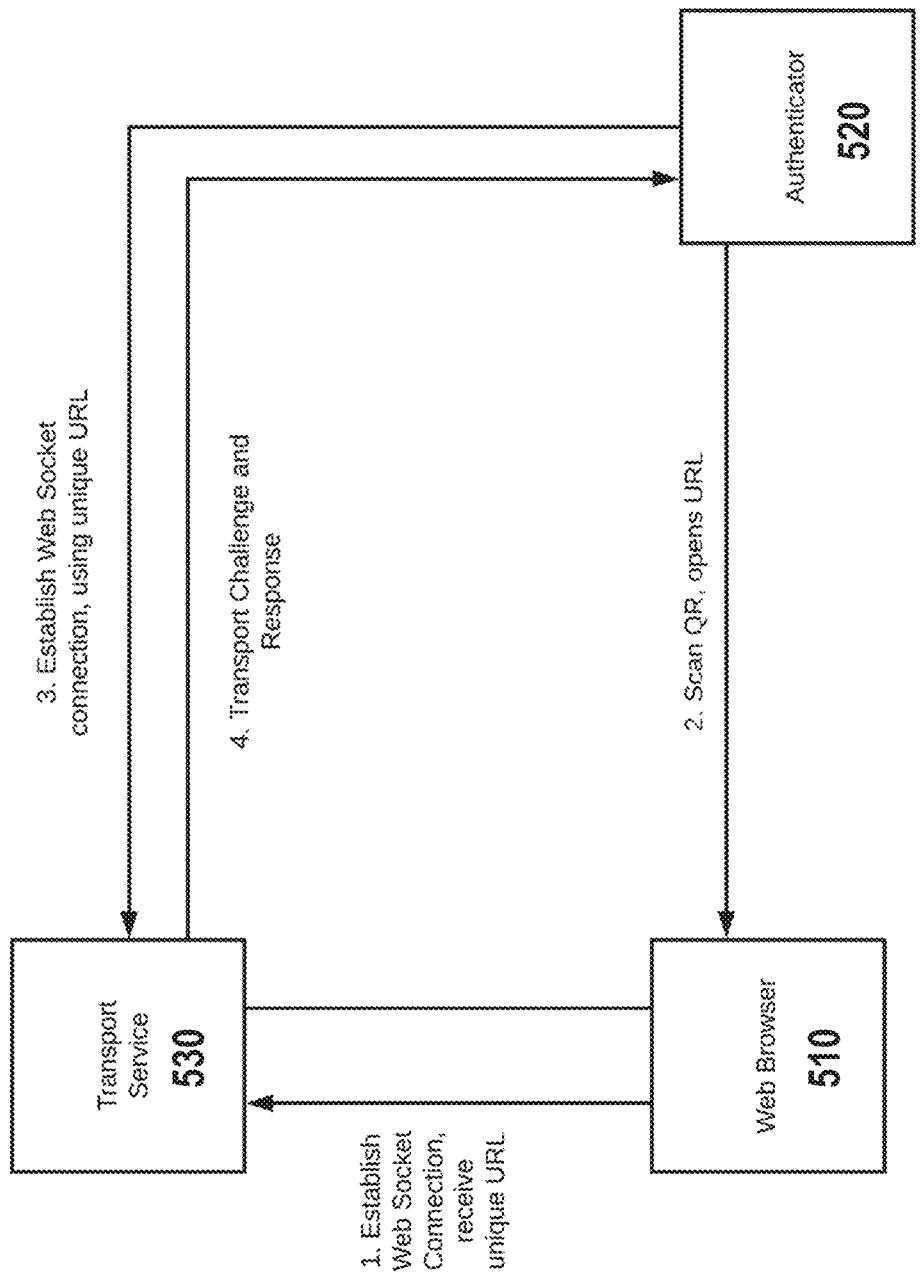
FIG. 5A shows an exemplary schematic illustrating use of web sockets to aid in authentication, in accordance with embodiments of the invention.

FIG. 5A shows an exemplary schematic illustrating use of web sockets to aid in authentication, in accordance with embodiments of the invention.

A web browser 510 may operate on a login device. The web browser may operate on a device that is network-enabled. The web browser may be capable of establishing a web socket connection with an authenticator 520 via a transport service 530. Any description herein of a web socket connection may apply to any type of bi-directional communication channel. In some embodiments, the connection may provide full duplex communications channels. Such communication channels may be provided over a single TCP (transmission control protocol) connection. In some embodiments, the connection may be compatible with HTTP, or may utilize an initial handshake that is HTTP compatible. The connection may permit interaction between the web browser and one or more servers of the transport service with low overhead. Web socket is a stateful protocol, which means the connection between client and server will keep alive until it is terminated by either party (client or server). Unlike HTTP requires request and response for each connection, the connection established by web socket may permit interactions with lower overhead than HTTP. This beneficially allows for a fast communication for the challenge and response during FIDO authentication. Any description herein of web socket connections may apply to connections having any of these characteristics. Any description herein of web socket may also apply to any communications that permit bi-directional communications between the web browser and the transport service.

The web socket connection between the web browser and transport service may allow for the web browser to request a unique URL. In some embodiments, the web browser may automatically generate the request for the URL when the user attempts to log in or access any other type of resource. In some embodiments, the web browser may automatically generate the request for the URL, when it is detected that the login device is unable to perform the required authentication (e.g., proximity-based authentication such as FIDO authentication). Optionally, the web browser may generate the request for the URL in response to a user input requesting the URL.

The transport service may generate a unique URL. The unique URL may be substantially unique and may be hosted by the transport service. The transport service may be operated by an online service provider. For example, if a user is attempting to access a resource at www.bank.com, the transport service may optionally provide a URL hosted by www.bank.com/. In other embodiments, the transport service may be owned operated independently of the online service provider. For example, if a user is attempting to access a resource at www.bank.com, the transport service may optionally be providing a URL hosted by www.transportservice.com/.

The URL may include a domain name of the relying party and a unique identifier. The transport service may generate the unique identifier in the URL in a randomized manner. The transport service may generate the URL with aid of one or more algorithms. The URL may be a random or pseudo-random series of characters. The URL may be at least 10 characters, 15 characters, 20 characters, 30 characters, 40 characters, or 50 characters long. The transport service may perform a check after a random URL is generated to ensure that the same URL is not currently active, or that the same URL had not been generated or activated within a past predetermined period of time (e.g., within the past hour, day, week, month, year, etc.).

When the URL is generated by the transport service, the URL may be sent to the web browser. The web browser may generate a graphical code, such as a QR code, that may encode the URL. In other examples, the transport service may generate the QR code with the URL encoded therein. The QR code may be sent to the web browser. The QR code may be displayed on the web browser.

An authenticator 520 may scan the QR code. The authenticator may be any device, such as those described elsewhere herein. The authenticator may have an imaging device that may capture an image of the QR code. The authenticator may be able to access the encoded URL from the QR code. The authenticator may or may not use specialized software or applications in order to access the URL from the QR code. The authenticator may utilize a network connection to communicate with a remote device that may access the URL from the QR code.

Accessing the URL may cause a new browser to be opened within the authenticator. The browser on-board the authenticator may be operating separately or independently of the web browser at the login device. Any description herein of the browser on the authenticator may also apply to an application that may be opened on the authenticator. The new browser may automatically open the URL. In some embodiments, the new browser may be automatically opened and directed to the URL upon image capture of the QR code, without requiring user input. Alternatively, a user may be prompted to take one or more steps, or to approve the opening of the URL.

A web socket connection may be established between the authenticator 520 and the transport service 530. The web socket connection may be established using the unique URL such that the transport service 530 functions as a proxy to establish a web socket between the web browser 510 and the authenticator 520. As previously described, any description herein of a web socket connection may apply to any type of bi-directional communication channel. In some embodiments, the connection may provide full duplex communications channels. Such communication channels may be provided over a single TCP (transmission control protocol) connection. In some embodiments, the connection may be compatible with HTTP, or may utilize an initial handshake that is HTTP compatible. The connection may permit interaction between the authenticator browser and one or more servers of the transport service with low overhead. In some embodiments, the connection may permit interactions with lower overhead than HTTP. Any description herein of web socket connections may apply to connections having any of these characteristics. Any description herein of web socket may also apply to any communications that permit bi-directional communications between the authenticator browser and the transport service.

The same type of connection may be established between the authenticator 520 and the transport service 530, as the web browser 510 and transport service 530. In some embodiments, for the systems and methods provided herein, any type of bi-directional communication between the transport service and both the web browser and authenticator may be sufficient. In some embodiments, as long as the web browser and the authenticator have some type of network connectivity (e.g., Internet, telecommunications network, data network, etc.), the systems and methods provided herein may be capable of operations.

The URL may be used to create the web socket connection between the authenticator and the transport service. The user may then be able to perform the full required authentication process on-board the authenticator. The challenge and responses required to perform the full required authentication may be transported between the transport service and the authenticator. The required authentication may be a proximity-based authentication, such as FIDO authentication. Any of the authentication techniques described elsewhere herein may be performed using the authenticator.

When authentication is confirmed, the user may be able to access the requested resource (e.g., log into a web site) at the original web browser 510. The transport service may communicate the confirmation of the authentication to the online service provider, which may grant access to the resource. The user may then interact with the original web browser on the login device in standard operations.

The systems and methods provided herein may advantageously allow a user to interact with a web browser on a device that may not support the required authentication (e.g., proximity-based authentication). The user may use the authenticator device to perform the authentication, and then interact with the original web browser when the authentication is confirmed. This may provide increased flexibility for the user to access the resource at various devices that may not typically support the required authentication.

Figure 5B:
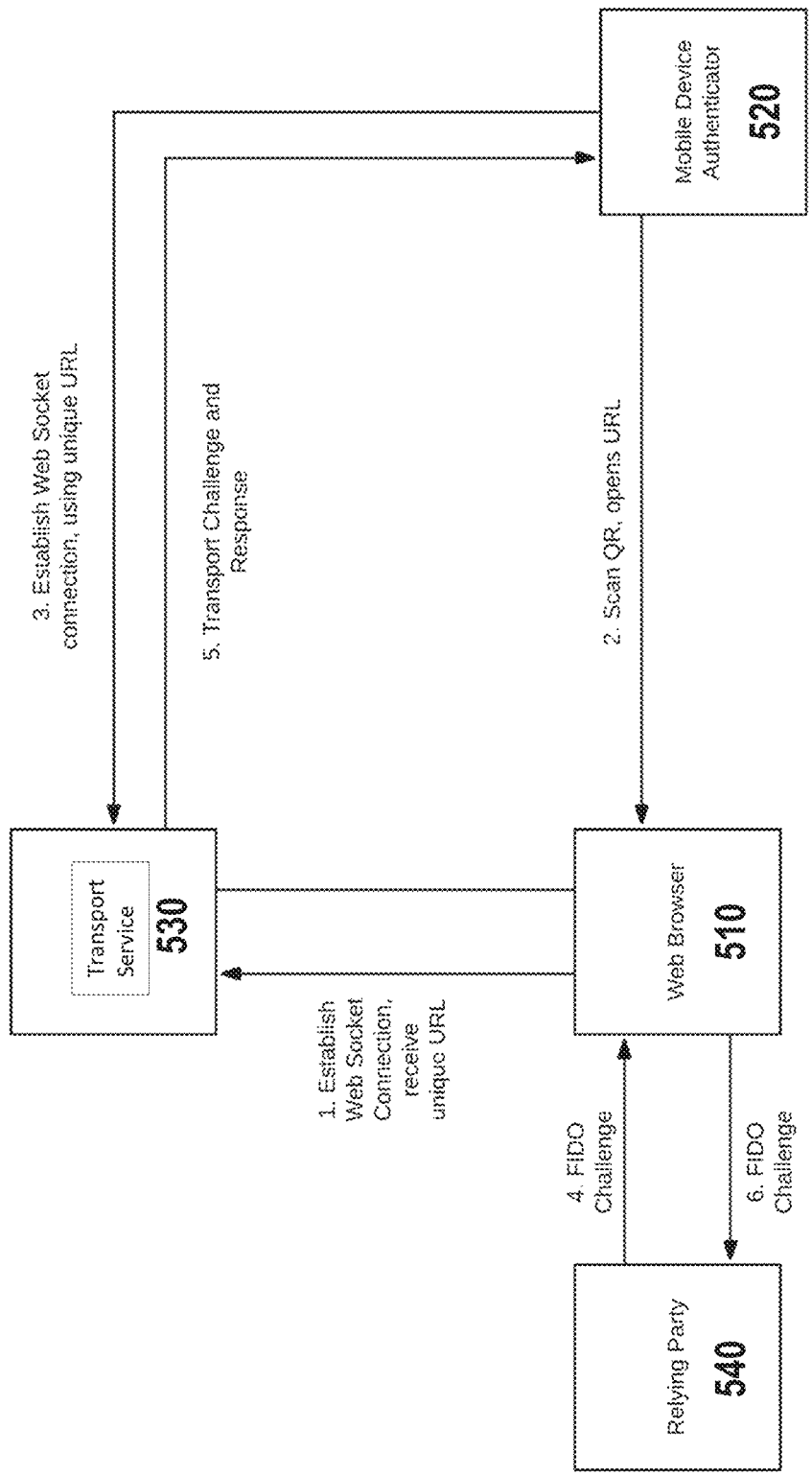
FIG. 5B shows another exemplary schematic illustrating use of web sockets to aid in authentication, in accordance with embodiments of the invention.

FIG. 5B shows another exemplary schematic illustrating use of web sockets to aid in authentication, in accordance with embodiments of the invention. Any of the characteristics or steps as described elsewhere herein may be applied.

A web socket connection is established between the web browser 510 on the login device and the transport service 530. A unique URL may be received by the web browser and a graphical code, such as a QR code, with the URL encoded therein may be displayed on the web browser. An authenticator 520, such as a mobile device, may capture an image of a graphical code. The mobile device may scan the graphical code and open the URL. The authenticator may establish a web socket connection, using the unique URL.

A FIDO challenge may be provided by a replying part 540 to the web browser. The transport service may transport the challenge and response for the FIDO authentication to the authenticator. Then the web browser may convey the FIDO response to the challenge to the relying party.

Figure 6A:
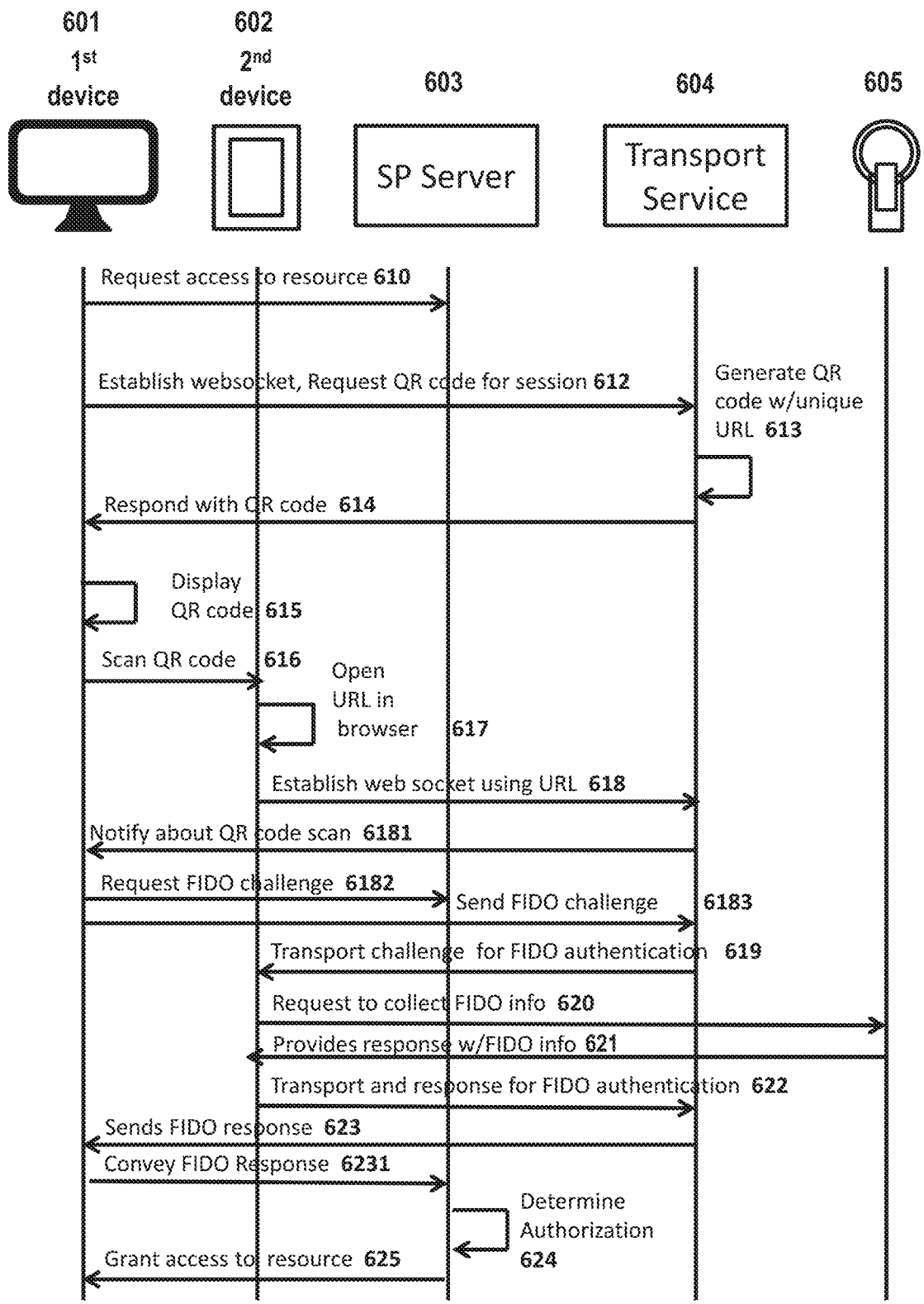
FIG. 6A shows an exemplary method for authenticating a user to access a resource, in accordance with embodiments of the invention.

FIG. 6A shows an exemplary method for authenticating a user to access a resource, in accordance with embodiments of the invention. In some embodiments, a login device 601, authenticator device 602, service provider server 603, transport service 604 and proximity-based authenticator 605 may be provided.

The service provider server and the transport service may be provided as the same server or as separate servers. The transport service may be part of the overall service provider system, or may be separate from the service provider system. Any description herein of steps that may be performed by the service provider or transport system may be performed by the same entity.

Similarly, the proximity-based authenticator may be illustrated as a dongle, but may apply to any hardware or software, or user presence that is required in order to perform proximity-based authentication. For example, the authenticator device may have local hardware, such as a biometric reader, cameras, microphones, temperature sensors, pressures sensors, ultrasonic sensors, antennas, or other types of hardware that may allow for proximity-based authentication. Similarly, the authenticator may have specialized software that may be useful for proximity-based authentication. In some instances, external devices may be required for proximity-based authentication (e.g., dongle, smart card, mobile device, etc.). In some instances, a user's physical presence may be required for proximity-based authentication (e.g., for biometric readings).

A user may wish to access an online resource. The user may interact with a login device 601. The user may interact with a browser of the login device. The login device (e.g., browser of the login device) may request access to a resource 610. The request may be provided to a service provider server 603.

In some embodiments, it may be determined that proximity-based authentication is disabled on the login device. In some instances, a user may provide an input indicating that the proximity-based authentication is not enabled on the login device. Alternatively, no indication of proximity-based authentication being disabled on the login device may be required.

A web socket connection may be established with a transport service 612. The login device may request a QR code for the session. The transport service may generate a QR code with unique URL encoded 613. The unique URL is within the domain of the relying party as described above. Alternatively, the transport service may only generate the unique URL.

In some embodiments, the transport service may provide the QR code to the login device 614. Alternatively, the transport service may provide the URL to the login device, and the login device may generate the QR code with the URL encoded therein.

The login device may display the QR code 615. The QR code may be displayed on a web browser of the login device.

An authenticator device 602 may scan the QR code 616. The authenticator device may have one or more cameras that may capture an image of the QR code. In some embodiments, the imaging devices may be able to capture the image of the QR code with sufficient clarity to be able to read the encoded information. If an image that is captured is not sufficiently clear, the authenticator may be prompted to take another picture.

The authenticator device may open the URL encoded within the QR code within a local browser of the authenticator device 617. Alternatively or in addition, an application may be opened based on the scanned QR code.

A web socket connection may be established between the authenticator and the transport service using the URL 618. The URL may be substantially unique. Even if other devices are using the transport service for different login sessions, their communications and authentications may remain segregated based on the unique URLs.

The transport service may notify the login device about the QR code scan 6181. The login device may request a FIDO challenge from the service provider 6182. The login device may also send the FIDO challenge 6183.

The transport service may transport a challenge for FIDO authentication to the authenticator 619. The authenticator may make a request to collect FIDO information 620. This may include a request to a user to provide biometric information, it may be a request to a user to provide an input at the authenticator or a remote device, it may include a request or ping to a remote device, such as a dongle or smart card, or other types of requests that may be required in order to complete proximity-based authentication.

The requested information may be provided 621. For example, a remote device may respond to the request by the authenticator. In some embodiments, direct wireless communications (e.g., Bluetooth, radio, optical, infrared, etc.) or wired communications may occur between the remote device and the authenticator. The remote device may be near field communication device or any type of device that may need to be within a proximity of the authenticator in order to provide the authentication. In another example, a user may respond to a request to provide biometric information.

The authenticator may transport the response for FIDO authentication to the transport service 622. The transport service may convey the FIDO authentication response to the login device 623. The login device may convey the FIDO authentication response to the service provider server 6231. The service provider may determine authorization of the user 624. The service provider may determine whether the user is authorized to access the requested resource.

When the user is determined to be authorized to access the requested resource, the user may be granted access to the resource 625. The service provider may provide an update which may cause the browser on the login device to allow the user to access the resource.

Figure 6B:
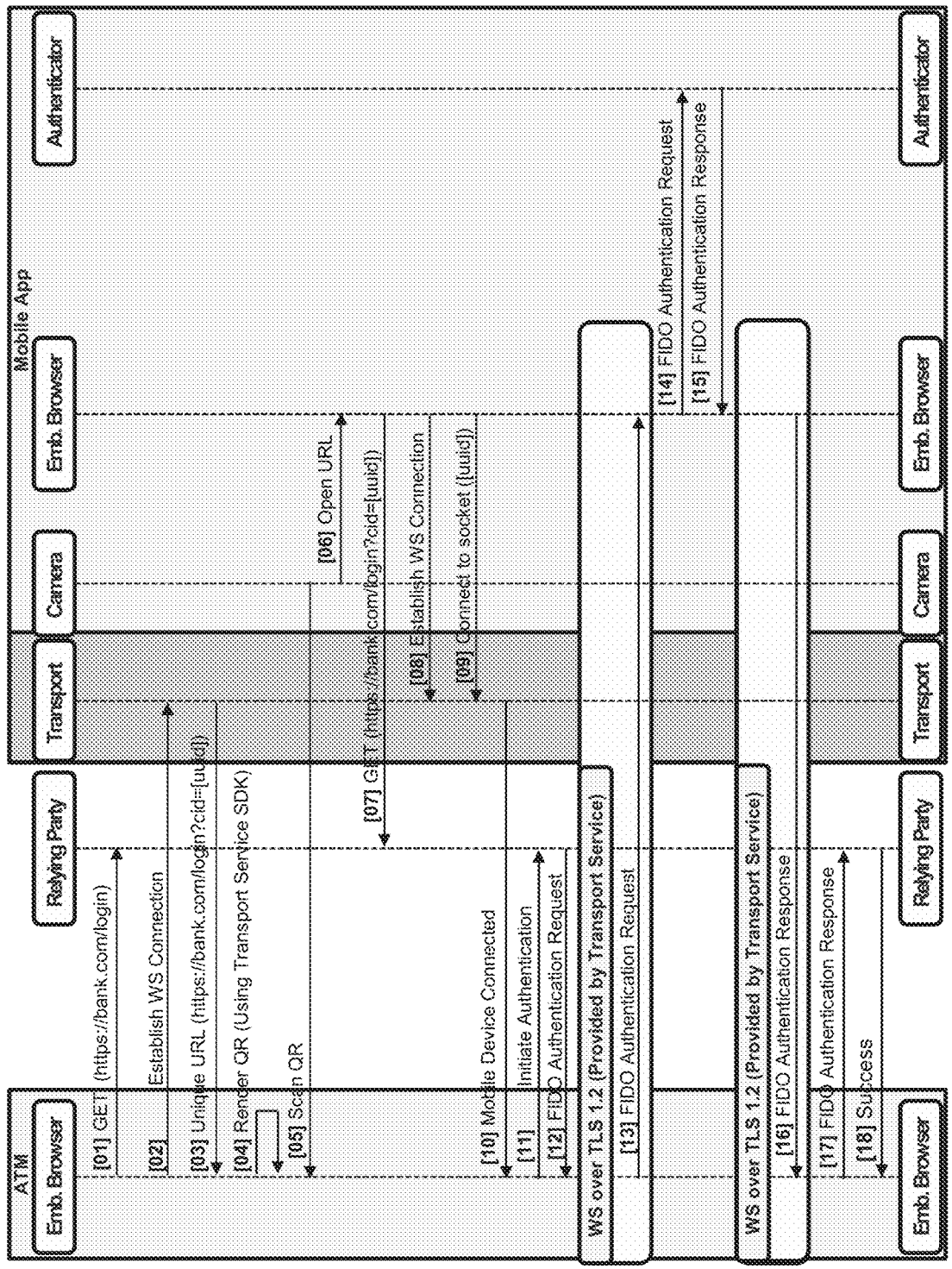
FIG. 6B shows another flow diagram for an exemplary method for authenticating a user to access a resource, in accordance with embodiments of the invention.

FIG. 6B shows another exemplary method for authenticating a user to access a resource, in accordance with embodiments of the invention. Any of the features, characteristics, or steps as described elsewhere herein may be applied. For instance, a user may wish to access an online resource by interacting with a login device (e.g., ATM). The user may interact with a native browser of the ATM. The login device (e.g., browser of the ATM) may request access to a resource (e.g., bank.com/login). The request may be provided to the relying party. The login device (e.g., ATM) may send a request to the transport service to establish a web socket connection.

In response to the request, the transport service may generate a unique URL (bank.com/login?cid=(uuid)) of the relying party domain. For instance, the URL contains the domain name bank.com and a unique identifier uuid.

Upon receiving the URL, the native browser of the ATM may generate and render a QR code encoded with the URL with aid of a software development kit (SDK) integrated into the browser. For example, the transport service may include a software development kit (SDK) or library embedded within a native application of the device, a standalone application callable by other applications, and/or an operating system level callable service. The SDK or library may enable the ATM browser to generate a QR code encoded with the unique URL.

A user may scan the QR code using the user device and the user device may be navigated to the URL. For example, the native browser on the user device may be directed to the unique URL hosted by the relying party. Concurrently, the user device may establish a web socket connection with the transport service using the unique identifier in the URL. This establishes a bi-directional web socket connection between the user device and ATM via the transport service. Upon receiving notification from the transport service indicating a web socket connection has been established with the user device, the ATM may notify the relying party and the relying party may send a FIDO authentication request to the native browser of the ATM. The native browser of the ATM may then transport the FIDO authentication request to the native browser of the user device via the web socket connection.

The user may then be prompted to perform the FIDO authentication locally at the user device such as with the authenticator (e.g., proximity-based authentication). Upon authentication, the authenticator may sign the challenge request and the native browser of the user device may send back the response to the native browser of the ATM via the web socket connection. The relying party may be informed of the authentication result.

During the above authentication process, the FIDO challenge and response are communicated within the domain of the relying party which beneficially increase the security of the network transportation. The pairing between the ATM and the user device is also simplified with aid of the QR code and the activation of the native browser application.

Figure 7:
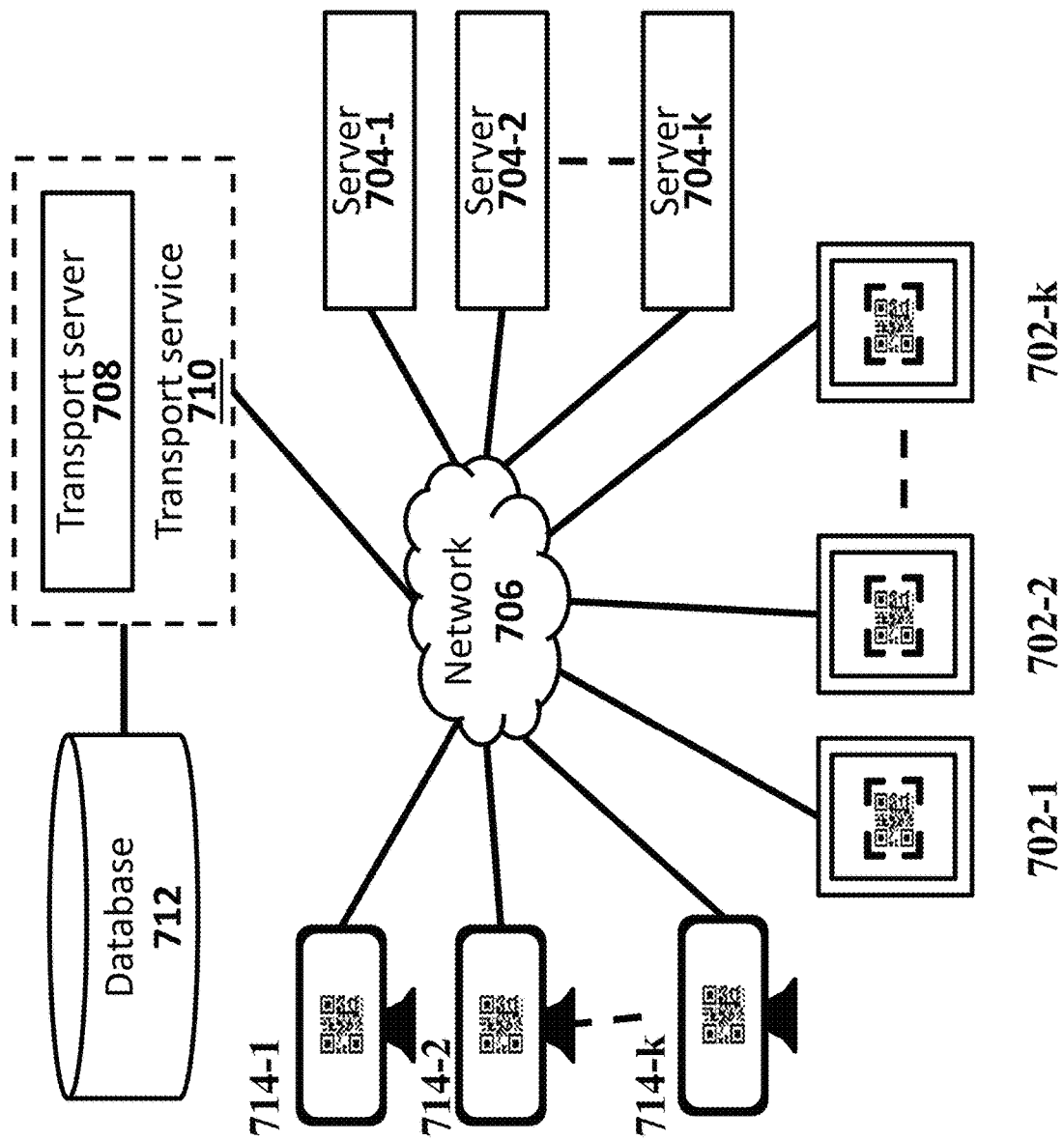
FIG. 7 shows an exemplary network layout showing one or more authentication systems, in accordance with embodiments of the invention.

FIG. 7 shows an exemplary network layout showing one or more authentication systems, in accordance with embodiments of the invention. In one aspect, the network layout may include a plurality of authenticator devices 702, one or more servers 704, a network 706, one or more databases 712, a plurality of login devices 714, a plurality of transport servers 708, and one or more transport systems 710. Each of the components 702, 704, 708, 710 and 714 may be operatively connected to one another via a network 706 or any other type of communication link that allows the transmission of data from one component to another.

An authenticator device 702, as described previously herein, can be, for example, one or more computing devices configured to perform one or more operations consistent with the disclosed embodiments. For example, an authenticator device may be a computing device that is capable of executing software or applications, including proximity-based authentications. In some embodiments, the software and/or applications may enable the user to scan a QR code or any other type of graphical code displayed on another device, process the QR code, and transmit authentication data between the authenticator device and the transport system during an authentication session. The software and/or application may or may not have been registered with the transport system by user. Optionally, the software and/or application may not be registered with the transport system. In some embodiments, the application may be configured to collect authentication data (e.g., image capture, capture time, etc.), and encrypt the data before sending them to the transport server during an authentication session. The authentication session may be hosted by a service provider server 704 on one or more interactive webpages, and accessed by one or more users.

As described previously, the authenticator device 702 may comprise an imaging device such as a camera and/or an imaging software. The camera and/or imaging software may be configured to be able to capture a QR code or a visual graphical barcode.

In some instances, the network 706 may comprise a plurality of authenticator devices 702. Each authenticator device may or may not be associated with one or more users. The one or more users may be located geographically at a same location, for example users working in a same office or a same geographical location. In some instances, some or all of the users and authenticator devices may be at remote geographical locations (e.g., different cities, countries, etc.), although this is not a limitation of the invention.

The network layout may comprise a plurality of nodes. A node may be part of a telecommunications network. A node may receive and/or relay information. A node may generate information that may be relayed. Each authenticator device 702 in the network may correspond to a node. In FIG. 7, if a "authenticator device 702" is followed by a number or a letter, it means that the "authenticator device 702" may correspond to a node sharing the same number or letter and other components corresponding to the node. For example, as shown in FIG. 7, authenticator device 702-1 may correspond to node 1 which is associated with user 1, login device 714-1, and server 704-1; authenticator device 702-2 may correspond to node 2 which is associated with user 2, login device 714-2, and server 704-2; and authenticator device 702-$k$ may correspond to node k which is associated with user k, authenticator device 714-$k$, and server 704-$k$, where k may be any positive integer.

A node may be a logically independent entity in the network layout. Therefore, the plurality of nodes in the network layout can represent different entities. For example, each node may be associated with a user, a group of users, or groups of users. For example, a node may correspond to an individual entity (e.g., an individual). In another example, a node may correspond to multiple entities (e.g., a group of individuals).

Any number of authentication sessions may occur simultaneously or sequentially. In some embodiments, multiple individuals may be attempting to log into web sites hosted by the same service provider or multiple service providers simultaneously. In some instances, a transport service may communicate with or support multiple servers for various service providers, as illustrated. In another example, each server or online service provider may have its own transport service that supports that particular online service provider. The transport service may be operated on a service provider server and a separate transport service/transport server may not be required.

A user may be registered or associated with the authentication system. For example, the user may be a registered user of an entity (e.g., a company, an organization, an individual, etc.) that provides, and/or administers, one or more of service provider servers 704. One user may be associated with or use one or more authenticator devices 702. One online service provider may be associated with one or more servers 704. The disclosed embodiments are not limited to any specific relationships or affiliations between the users and the online service providers or servers 704, databases 712, transport servers 708, and transport systems 710.

An authenticator device 702 may be configured to receive input from one or more users. A user may provide an input to a user device using an input device such as, for example, a keyboard, a mouse, a touch-screen panel, voice recognition and/or dictation software or any combination of the above. Examples of other user interactive devices may include a button, touchpad, joystick, trackball, camera, microphone, motion sensor, heat sensor, inertial sensor, or any other type of user interactive device. The input may include a user performing various virtual actions during an authentication session or before an authentication session. The input may include, for example, biometric information in order for the user to be authenticated, such as a fingerprint, hand scan, iris scan, facial recognition, gesture, walk, voice, or any other feature. The input may include activation or proximity of an object carried or worn by the user.

In the illustration of FIG. 7, two-way data transfer capability may be provided between any two components, including the transport server 708 and each authentication device 702, the service provider server 704 and each authentication device 702, the authentication server 708 and each service provider server 704, the service provider server 704 and each login device 714, the transport server 708 and each login device 714, etc.

A transport server 708 may comprise one or more server computers configured to perform one or more operations consistent with disclosed embodiments. In one aspect, a transport may be implemented as a single computer through which an authenticator device 702 and/or a login device 714 is able to communicate with other components of the network 706. In some instances, an authenticator device may communicate with the transport server through the network. In other instances, the transport server may communicate on behalf of an authenticator device and/or login device with the one or more transport systems 710 or the database 712 through the network. In one aspect, the transport server may embody the functionality of one or more transport systems. In another aspect, the one or more transport systems may be implemented inside and/or outside of the service provider server(s). Any server may also be a server in a data network (e.g., a cloud computing network).

In some instances, an authenticator device and/or a login device may be directly connected to the transport server through a separate link. They may be directly connected via web sockets. In certain instances, the transport server may be configured to operate as a front-end device configured to provide access to one or more transport systems consistent with certain disclosed embodiments. The transport server may, in some instances, utilize the one or more transport systems to process data provided by an authenticator device (e.g., FIDO authentication data) in order to compare and match the authentication data (e.g., timestamp, validation ID, etc.) and user information requirement data for authentication purposes and user information population purposes. The transport server may be configured to store the authentication data, user information data for users, and user information requirement data for online service providers in one or more databases 712. The transport server may also be configured to search, retrieve, and analyze (e.g., decrypt, decode, compare, etc.) authentication data stored in the one or more databases. The transport server may also be configured to search, retrieve, and store user information data and user information requirement data in the one or more databases. As previously described, the transport service may be operating on one or more service providers and any description herein of the transport server may apply to any respective service provider servers.

In some instances, an authenticator device 702 and/or login device 714 may be directly connected to a server 704 of an online service provider to open or access an online account. In some instances, the server may include a web server, an enterprise server, or any other type of computer server, and can be computer-programmed to accept requests (e.g., HTTP, or other protocols that can initiate data transmission) from a computing device (e.g., a user device, a public share device) and to provide the computing device with requested data. In addition, a server can be a broadcasting facility, such as free-to-air, cable, satellite, and other broadcasting facility, for distributing data. A server may also be a server in a data network (e.g., a cloud computing network).

A server 704 may comprise known computing components, such as one or more processors, one or more memory devices storing software instructions executed by the processor(s), and data. A server can have one or more processors and at least one memory for storing program instructions. The one or more processors can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs (application specific integrated circuits), special purpose computers, or general purpose computers. While FIG. 7 illustrates the transport server 708 as a single server, in some embodiments, multiple devices may implement the functionality associated with the transport server, or the functionality of the transport server may be performed by the service provider server 714.

The network 706 may be configured to provide communication between various components of the network layout. The network may comprise one or more networks that connect devices and/or components in the network layout to allow communication between the devices and/or components. For example, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio. The network may be wireless, wired (e.g., Ethernet), or a combination thereof.

The one or more transport systems 710 may be implemented as one or more computers storing instructions that, when executed by one or more processors, can generate a plurality of unique URLs and/or visual graphical codes (e.g. QR codes) upon request each of which is associated with a specific session (e.g., via validation ID, session ID, etc.), and provide the codes or locators of the codes to the server 704. Users may scan the codes through authenticator devices 702 and transmit the scan data back to the one or more transport systems. The one or more transport systems may either, based on the codes and/or the scan data, provide user authentication to online service providers, and/or provide online service provider authentication to users for the purpose of one-sided or mutual authentication. The one or more transport systems may simply convey the information to the online service providers who may make the determination regarding authentication for users. Upon verification, the transport system may provide confirmation to the online service provider, which may allow a user to access the requested resources on the login devices. In some instances, the server may comprise the computer in which the one or more transport systems and/or authentication systems are implemented. Alternatively, the transport server may comprise the computer in which the one or more authentication systems are implemented. Alternatively, the one or more transport system may be implemented on separate computers.

The server may access and execute the one or more authentication systems to perform one or more processes consistent with the disclosed embodiments. In certain configurations, the one or more authentication systems may be a software stored in memory accessible by the server (e.g., in a memory local to the server or remote memory accessible over a communication link, such as the network). Thus, in certain aspects, the one or more authentication systems may be implemented as one or more computers, as software stored on a memory device accessible by the server, or a combination thereof. For example, one authentication system may be a computer hardware executing one or more authentication techniques, and another authentication system may be software that, when executed by the server, performs one or more authentication techniques.

The one or more authentication systems can be used to authenticate users in a variety of different ways. For example, the one or more authentication systems may store and/or execute software that performs an algorithm for authenticating a user based on FIDO authentication collected with aid of authenticator devices. The one or more transport systems may also store and/or execute software that performs an algorithm for generating unique URLs and/or visual graphical codes (e.g. QR codes) having a specific validation ID. The transport systems may communicate with one or more authentication systems may further store and/or execute software that performs an algorithm for searching, retrieving, and storing user information for users and user information requirement data for online service providers.

The disclosed embodiments may be configured to implement the one or more authentication systems such that a variety of algorithms may be performed to execute one or more authentication techniques and authentication sequences, including provision of required user information after an authentication is complete. Although a plurality of authentication systems have been described for performing the above algorithms, it should be noted that some or all of the algorithms may be performed using a single authentication system, consistent with disclosed embodiments.

The authenticator devices 702, transport server 708, service provider servers 704, and the one or more transport systems 710 may be connected or interconnected to one or more databases 712. The one or more databases may be one or more memory devices configured to store data (e.g., QR code, FIDO authentication information, user identity, user device identity, service provider identity, server identity, transaction/validation ID, user information, user information requirement etc.). Additionally, the one or more databases may also, in some embodiments, be implemented as a computer system with a storage device. In one aspect, the one or more databases may be used by components of the network layout to perform one or more operations consistent with the disclosed embodiments. In certain embodiments, the one or more the databases may be co-located with the server, or co-located with the authentication server, and/or co-located with one another on the network. One of ordinary skill will recognize that the disclosed embodiments are not limited to the configuration and/or arrangement of the one or more databases.

A login device 712 may be an unauthenticated device in that the identity of the device is not, and need not necessarily be, registered with a transport or authentication system. In some embodiments, the device is what the user uses to access a web portal or website provided by the service provider server 704 to open or access an online account with an online service provider. The login device may be a publicly shared device whose identity is not known to the authentication system. As described previously, the login device may be configured to display a visual graphical code (e.g. QR code) and/or user interfaces (e.g., web portal, website) to the user. The visual graphical codes or locators of the codes may be transmitted to the display device from a transport server. In some embodiments, when a locator (e.g., URL) is provided, the QR code may be displayed via an interface such as a webpage or any software. The interface can be linked to the server via the locator (e.g., URL) to establish a communication between the user and the transport server. The login device can be a computer (e.g., laptop computer, desktop computer), a mobile device (e.g., smartphone, tablet, pager, personal digital assistant (PDA)), a kiosk, an ATM, a smart appliance, a vending machine or the like requiring authentication or verification of the user to open or access an online account on the server (e.g., with an online service provider). The login device may optionally be portable. The login device may be handheld.

Any of the authenticator devices 702, the login devices 714, the servers 704, the one or more databases 712, and/or the one or more transport systems 710 may, in some embodiments, be implemented as a computer system. Additionally, while the network is shown in FIG. 7 as a "central" point for communications between components of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate. Additionally, while some disclosed embodiments may be implemented on the server, the disclosed embodiments are not so limited. For instance, in some embodiments, other devices (such as one or more authenticator or login devices) may be configured to perform one or more of the processes and functionalities consistent with the disclosed embodiments, including embodiments described with respect to the server and the authentication system.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Computer Control Systems

Figure 8:
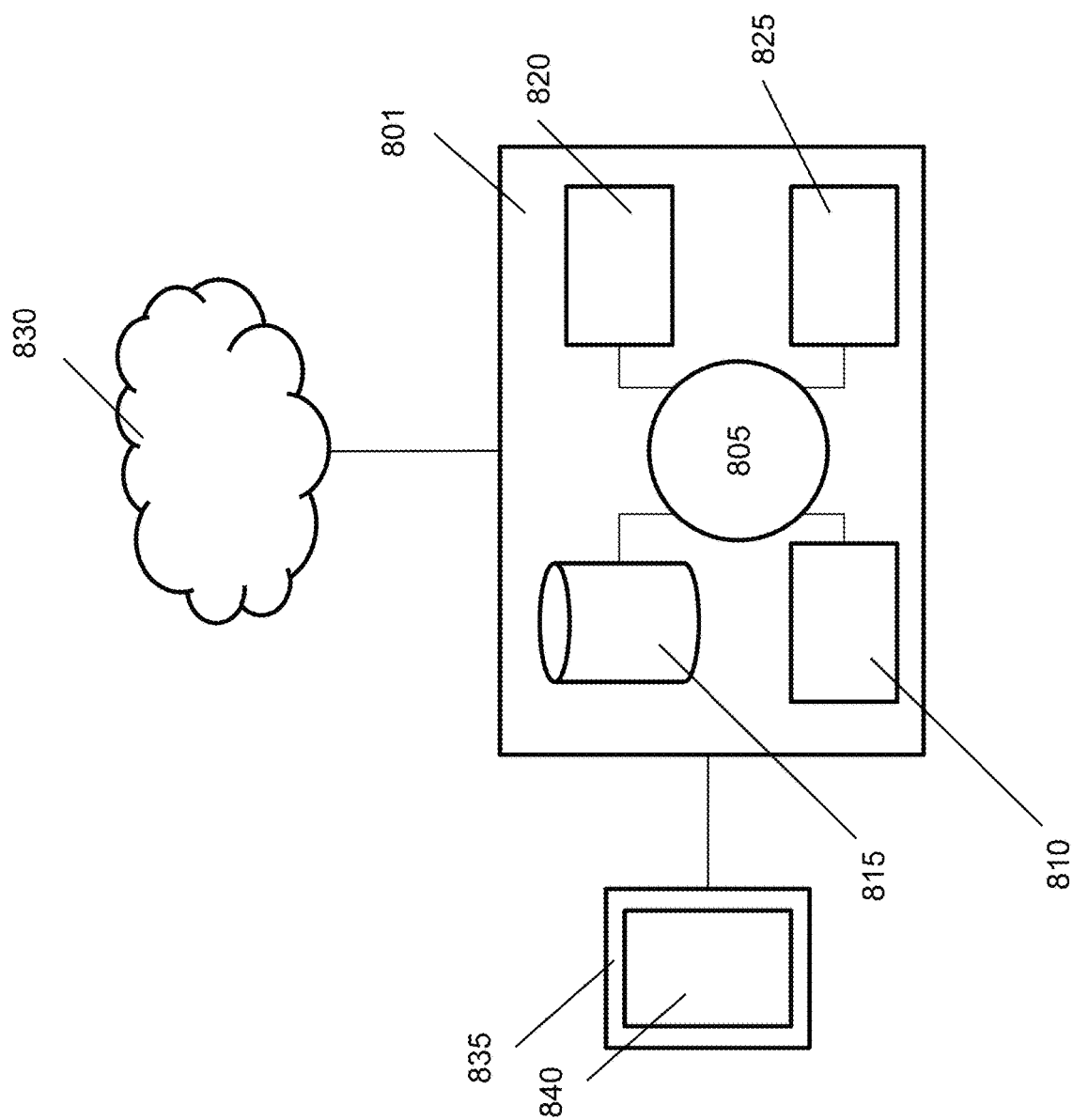
FIG. 8 shows an exemplary computer system, in accordance with embodiments of the invention.

The present disclosure provides computer control systems that are programmed to implement methods of the disclosure. FIG. 8 shows a computer system 801 that is programmed or otherwise configured to facilitate authentication of a user attempting to access an online resource. The computer system may enable the user of FIDO authentication. The computer system may be a login device, an authenticator device, a transport service, or part of a provider service. The computer system can be an electronic device of a user or a computer system that is remotely located with respect to the electronic device. The electronic device can be a mobile electronic device.

The computer system 801 may include a central processing unit (CPU, also "processor" and "computer processor" herein) 805, which can be a single core or multi core processor, or a plurality of processors for parallel processing. The computer system also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet.

The network 830 in some cases is a telecommunication and/or data network. The network can include one or more computer servers, which can enable distributed computing, such as cloud computing. For example, one or more computer servers may enable cloud computing over the network ("the cloud") to perform various aspects of analysis, calculation, and generation of the present disclosure, such as, for example, capturing a configuration of one or more experimental environments; storing in a registry the experimental environments at each of one or more time points; performing one or more experimental executions which leverage experimental environments; providing outputs of experimental executions which leverage the environments; generating a plurality of linkages between the experimental environments and the experimental executions; and generating one or more execution states corresponding to the experimental environments at one or more time points. Such cloud computing may be provided by cloud computing platforms such as, for example, Amazon Web Services (AWS), Microsoft Azure, Google Cloud Platform, and IBM cloud. The network, in some cases with the aid of the computer system 801, can implement a peer-to-peer network, which may enable devices coupled to the computer system to behave as a client or a server.

The CPU 805 can execute a sequence of machine-readable instructions, which can be embodied in a program or software. The instructions may be stored in a memory location, such as the memory 810. The instructions can be directed to the CPU, which can subsequently program or otherwise configure the CPU to implement methods of the present disclosure. Examples of operations performed by the CPU can include fetch, decode, execute, and writeback.

The CPU 805 can be part of a circuit, such as an integrated circuit. One or more other components of the system can be included in the circuit. In some cases, the circuit is an application specific integrated circuit (ASIC).

The storage unit 815 can store files, such as drivers, libraries and saved programs. The storage unit can store user data, e.g., user preferences and user programs. The computer system 801 in some cases can include one or more additional data storage units that are external to the computer system, such as located on a remote server that is in communication with the computer system through an intranet or the Internet.

The computer system 801 can communicate with one or more remote computer systems through the network 830. For instance, the computer system can communicate with a remote computer system of a user (e.g., a user of an experimental environment). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine having a processor adapted to execute the code, or can be compiled during runtime. The code can be supplied in a programming language that can be selected to enable the code to execute in a pre-compiled or as-compiled fashion.

programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 1035 that comprises a user interface (UI) 840 for providing, for example, selection of an environment, a component of an environment, or a time point of an environment. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 805. The algorithm can, for example, capture a configuration of one or more experimental environments; store in a registry the experimental environments at each of one or more time points; perform one or more experimental executions which leverage experimental environments; provide outputs of experimental executions which leverage the environments; generate a plurality of linkages between the experimental environments and the experimental executions; and generate one or more execution states corresponding to the experimental environments at one or more time points.

The systems and methods provided herein may provide one or more advantages that provide increased flexibility in providing access to a user to an online resource while maintaining security. The systems and methods provided herein rely on existing (e.g., web) communication channels, without requiring specialized protocols, such as USB, NFC, or BLE. This provides an increased flexibility in the types of login devices that can be used to access particular resources. For instance, even ATMs may be used to access the login resources without requiring specialized protocols. The systems and methods provided herein support FIDO notion of physical proximity, and may be advantageously compatible with existing FIDO architecture.

The systems and methods provided herein provide increase usability, with quick and simple pairing. The systems and methods provided herein may provide omni-channel use of mobile platform 'build-in' application. The systems and methods may be able provide increased usability without compromising on security. A TLS 1.2 secured web socket may be used. The systems and methods provided herein may be decentralized.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for providing authentication for accessing a resource provided by a service provider via a login device, the method comprising:

upon detecting the login device does not support a proximity-based authentication, generating a unique Uniform Resource Locator (URL) within a network domain of the service provider's network, wherein the unique URL contains a name of the network domain of the service provider;

generating a graphical code encoded with the unique URL that is to be rendered on the login device for accessing the resource provided by the service provider;

upon scanning the graphical code with aid of a camera of a user mobile device, accessing the unique URL to establish a network connection between the login device and the user mobile device; and performing, using a cryptographic key, a cryptographic challenge and a cryptographic response between the user mobile device and the service provider via the network connection to conduct authentication for accessing the resource via the login device, wherein the cryptographic response is signed and transmitted to the network domain of the service provider's network by accessing the unique URL that contains the name of the network domain of the service provider.

2. The method of claim 1, wherein the graphical code is QR code.

3. The method of claim 1, wherein the unique URL is provided to the login device via a web socket connection.

4. The method of claim 1, wherein the graphical code is provided to the login device via a web socket connection.

5. The method of claim 1, wherein the graphical code is rendered within a native application on the login device.

6. The method of claim 5, wherein the graphical code is generated by the native application.

7. The method of claim 1, wherein the network connection between the login device and the user device is a web socket connection.

8. The method of claim 1, wherein the cryptographic challenge and the cryptographic response is a FIDO (Fast IDentity Online) authentication.

9. The method of claim 8, wherein the cryptographic challenge and the cryptographic response for the FIDO authentication is signed using the cryptographic key.

10. The method of claim 9, wherein the cryptographic challenge and the cryptographic response are communicated via a native browser of the user mobile device.

11. The method of claim 1, wherein the unique URL comprises a random or pseudo-random series of characters.

12. The method of claim 1, wherein the unique URL further contains a unique identifier.

13. A system for providing authentication for accessing a resource provided by a service provider via a login device, the system comprising:
- a non-transitory computer-readable medium storing software instructions, and one or more processors configured to execute the software instructions to:
  - i) upon detecting the login device does not support a proximity-based authentication, generate a unique Uniform Resource Locator (URL) within a network domain of the service provider's network, wherein the unique URL contains a name of the network domain of the service provider;
  - ii) generate a graphical code encoded with the unique URL that is to be rendered on the login device for accessing the resource provided by the service provider; and
- a user mobile device configured to:
  - (i) scan the graphical code with aid of a camera of the user mobile device and establish a network connection with the login device accessing the unique URL that is encoded into the graphical code,
  - (ii) perform, using a cryptographic key, a cryptographic challenge and a cryptographic response with the service provider via the network connection to conduct authentication for accessing the resource via the login device, wherein the cryptographic response is signed and transmitted to the network domain of the service provider's network by accessing the unique URL that contains the name of the network domain of the service provider.

14. The system of claim 13, wherein the graphical code is QR code, and wherein the graphical code is rendered within a native application on the login device.

15. The system of claim 13, wherein the unique URL is provided to the login device via a bi-directional web socket connection.

16. The system of claim 13, wherein the graphical code is provided to the login device via a bi-directional web socket connection.

17. The system of claim 13, wherein the network connection between the login device and the user device is a bi-directional web socket connection.

18. The system of claim 13, wherein the cryptographic challenge and the cryptographic response is a FIDO authentication.

19. The system of claim 13, wherein the cryptographic challenge for the FIDO authentication is transmitted via the network connection and wherein the cryptographic challenge and the cryptographic response are communicated via a native browser of the user device.

20. The system of claim 13, wherein the unique URL further contains a unique identifier.

* * * * *